(12) United States Patent
Silverstein et al.

(10) Patent No.: US 12,159,301 B2
(45) Date of Patent: Dec. 3, 2024

(54) TEXT PROCESSING BASED INTERFACE ACCELERATING

(71) Applicant: INTERNATIONAL BUSINESS MACHINES CORPORATION, Armonk, NY (US)

(72) Inventors: Zachary A. Silverstein, Jacksonville, FL (US); Indervir Singh Banipal, Austin, TX (US); Shikhar Kwatra, Durham, NC (US); Raghuveer Prasad Nagar, Kota (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 511 days.

(21) Appl. No.: 16/802,265

(22) Filed: Feb. 26, 2020

(65) Prior Publication Data

US 2021/0264480 A1    Aug. 26, 2021

(51) Int. Cl.
*G06Q 30/0282*    (2023.01)
*G06F 16/951*    (2019.01)
(Continued)

(52) U.S. Cl.
CPC ....... *G06Q 30/0282* (2013.01); *G06F 16/951* (2019.01); *G06F 16/958* (2019.01);
(Continued)

(58) Field of Classification Search
CPC .... G06F 3/1454; G06F 16/958; G06F 16/951; G06F 40/174; G06Q 30/0282
See application file for complete search history.

(56) References Cited

U.S. PATENT DOCUMENTS 7,689,557 B2    3/2010 Pandit et al.
7,962,461 B2    6/2011 Ruhl et al.
(Continued)

FOREIGN PATENT DOCUMENTS

CN    107609960 A  *  1/2018

OTHER PUBLICATIONS

Mell, Peter, et al., "The NIST Definition of Cloud Computing", NIST Special Publication 800-145, Sep. 2011, Gaithersburg, MD, 7 pgs.

*Primary Examiner* — Scott T Baderman
*Assistant Examiner* — Seung Woon Jung
(74) *Attorney, Agent, or Firm* — Elliot J. Shine, Esq.; HESLIN, ROTHENBERG, FARLEY & MESITI, P.C.; George S. Blasiak, Esq.

(57) ABSTRACT

Methods, computer program products, and systems are presented. The method computer program products, and systems can include, for instance: examining user browsing data from a browser plugin of a client computer device, the client computing device being associated to the user; determining a current activity classification of the user in dependence on the examining user browsing data from the browser plugin of the client computer device; in response to the current activity classification satisfying a criterion, performing web crawling to obtain crowdsourced product review data of one or more product, the crowdsourced product review data comprising data from product reviews by multiple reviewers other than the user and including data from reviews from multiple product review sites; subjecting the crowdsourced product review data to natural language processing for extracting data tags associated to respective product reviews of the crowdsourced product review data; determining prompting data in dependence on the extracting data tags associated to respective product reviews of the
(Continued)

crowdsourced product review data; and communicating the prompting data to the user, the prompting data guiding the user in the authoring of a product review of a certain product.

21 Claims, 10 Drawing Sheets

(51) Int. Cl.
*G06F 16/958* (2019.01)
*G06Q 30/0601* (2023.01)
*H04L 67/50* (2022.01)
*G06F 40/174* (2020.01)
*G06F 40/205* (2020.01)
*G06F 40/279* (2020.01)

(52) U.S. Cl.
CPC ..... *G06Q 30/0627* (2013.01); *G06Q 30/0641* (2013.01); *H04L 67/535* (2022.05); *G06F 40/174* (2020.01); *G06F 40/205* (2020.01); *G06F 40/279* (2020.01)

(56) References Cited

U.S. PATENT DOCUMENTS

| | | |
|---|---|---|
| 8,554,701 B1 | 10/2013 | Dillard et al. |
| 8,671,098 B2 | 3/2014 | Salvetti |
| 9,092,789 B2 | 7/2015 | Ansuhl |
| 9,552,429 B1 | 1/2017 | Burton et al. |
| 9,646,078 B2 | 5/2017 | Galitsky et al. |
| 10,268,677 B2 | 4/2019 | Lei et al. |
| 2009/0319342 A1 | 12/2009 | Shilman et al. |
| 2012/0290606 A1* | 11/2012 | Kumar ................ G06F 16/9535 707/769 |
| 2013/0218914 A1 | 8/2013 | Stavrianou et al. |
| 2016/0203500 A1* | 7/2016 | Williams ................ G06F 16/33 705/7.32 |
| 2018/0182001 A1* | 6/2018 | Ghoshal ................ G06Q 50/01 |
| 2021/0150604 A1* | 5/2021 | Ghorbani ........... G06Q 30/0627 |

* cited by examiner

TEXT PROCESSING BASED INTERFACE ACCELERATING

Data structures have been employed for improving operation of computer systems. A data structure refers to an organization of data in a computer environment for improved computer system operation. Data structure types include containers, lists, stacks, queues, tables and graphs. Data structures have been employed for improved computer system operation e.g. in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

SUMMARY

Shortcomings of the prior art are overcome, and additional advantages are provided, through the provision, in one aspect, of a method. The method can include, for example: examining user browsing data from a browser plugin of a client computer device, the client computing device being associated to the user: determining a current activity classification of the user in dependence on the examining user browsing data from the browser plugin of the client computer device: in response to the current activity classification satisfying a criterion, performing web crawling to obtain crowdsourced product review data of one or more product, the crowdsourced product review data comprising data from product reviews by multiple reviewers other than the user and including data from reviews from multiple product review sites: subjecting the crowdsourced product review data to natural language processing for extracting data tags associated to respective product reviews of the crowdsourced product review data: determining prompting data in dependence on the extracting data tags associated to respective product reviews of the crowdsourced product review data; and communicating the prompting data to the user, the prompting data guiding the user in the authoring of a product review of a certain product.

In another aspect, a computer program product can be provided. The computer program product can include a computer readable storage medium readable by one or more processing circuit and storing instructions for execution by one or more processor for performing a method. The method can include, for example: examining user browsing data from a browser plugin of a client computer device, the client computing device being associated to the user: determining a current activity classification of the user in dependence on the examining user browsing data from the browser plugin of the client computer device; in response to the current activity classification satisfying a criterion, performing web crawling to obtain crowdsourced product review data of one or more product, the crowdsourced product review data comprising data from product reviews by multiple reviewers other than the user and including data from reviews from multiple product review sites: subjecting the crowdsourced product review data to natural language processing for extracting data tags associated to respective product reviews of the crowdsourced product review data: determining prompting data in dependence on the extracting data tags associated to respective product reviews of the crowdsourced product review data; and communicating the prompting data to the user, the prompting data guiding the user in the authoring of a product review of a certain product.

In a further aspect, a system can be provided. The system can include, for example, a memory. In addition, the system can include one or more processor in communication with the memory. Further, the system can include program instructions executable by the one or more processors via the memory to perform a method. The method can include, for example: examining user browsing data from a browser plugin of a client computer device, the client computing device being associated to the user: determining a current activity classification of the user in dependence on the examining user browsing data from the browser plugin of the client computer device: in response to the current activity classification satisfying a criterion, performing web crawling to obtain crowdsourced product review data of one or more product, the crowdsourced product review data comprising data from product reviews by multiple reviewers other than the user and including data from reviews from multiple product review sites: subjecting the crowdsourced product review data to natural language processing for extracting data tags associated to respective product reviews of the crowdsourced product review data: determining prompting data in dependence on the extracting data tags associated to respective product reviews of the crowdsourced product review data; and communicating the prompting data to the user, the prompting data guiding the user in the authoring of a product review of a certain product.

Shortcomings of the prior art are overcome, and additional advantages are provided, through the provision, in one aspect, of a method. The method can include, for example: examining user browsing data from a client computer device, the client computing device being associated to the user: determining a current activity classification of the user in dependence on the examining user browsing data: in response to the current activity classification satisfying a criterion, performing processing of crowdsourced product review data of one or more product: subjecting the crowdsourced product review data to processing for extracting data tags: determining prompting data; and communicating the prompting data to the user.

Shortcomings of the prior art are overcome, and additional advantages are provided, through the provision, in one aspect, of a method. The method can include, for example: examining data from a client computer device, the client computing device being associated to the user: determining a classification in dependence on the examining data: in response to the classification satisfying a criterion, performing processing of data of one or more product; and communicating data to the user.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
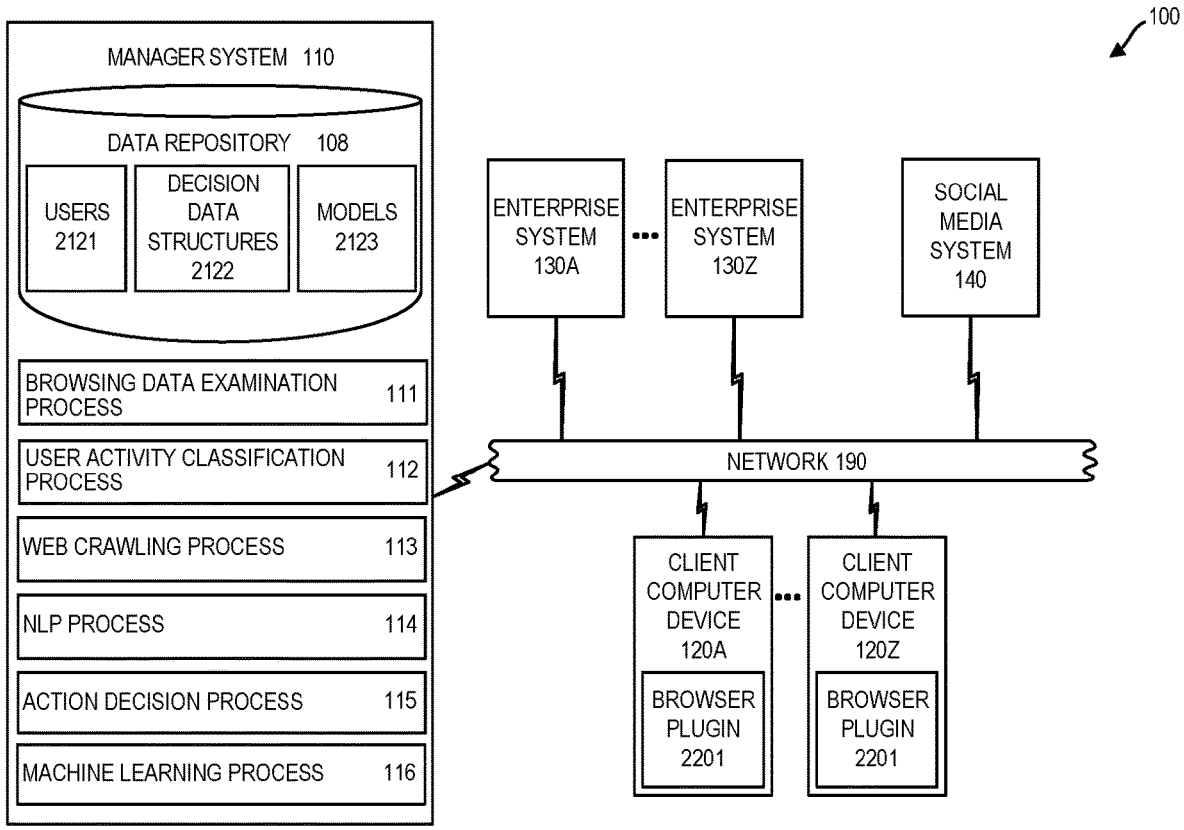
FIG. 1 depicts a system having a manager system, client computer devices, enterprise systems, and a social media system according to one embodiment.

System 100 for use in accelerating performance of a user interface is shown in FIG. 1. System 100 can include manager system 110, client computer devices 120A-120Z, enterprise systems 130A-130Z, and social media system 140. Manager system 110, client computer devices 120A-120Z, enterprise systems 130A-130Z, and social media system 140 can be in communication with one another via network 190. System 100 can include numerous devices which can be computing node based devices connected by network 190. Network 190 can be a physical network and/or a virtual network. A physical network can be, for example, a physical communications network connecting numerous computing nodes or systems such as computer servers and computer clients. A virtual network can, for example, combine numerous physical networks, or parts thereof, into logical virtual networks. In another example, numerous virtual networks can be defined as a single physical network.

In one embodiment, manager system 110 can be external to client computer devices 120A-120Z, enterprise systems 130A-130Z, and social media system 140. In another embodiment manager system, 110 can be collocated with one or more of client computer devices 120A-120Z, enterprise systems 130A-130Z, and social media system 140. In one embodiment, each of client computer devices 120A-120Z can be associated with a certain user. In one embodiment, users of system 100 can be registered users of system 100. Each of the different client computer devices 120A-120Z can be associated to a different user.

Client computer devices 120A-120Z can be computing node based devices provided by a client computer, e.g. smart phone or tablet, laptop, smart watch, or PC that runs one or more programs, e.g., including web browser for opening and viewing web pages.

Social media system 140 can include a collection of files, including for example, HTML files, CSS files, image files, and JavaScript files. Social media system 140 can be a social website such as FACEBOOK® (Facebook is a registered trademark of Facebook, Inc.), TWITTER® (Twitter is a registered trademark of Twitter, Inc.), LINKEDIN® (LinkedIn is a registered trademark of LinkedIn Corporation), or INSTAGRAM® (Instagram is a registered trademark of Instagram, LLC). Computer implemented social networks incorporate messaging systems that are capable of receiving and transmitting messages to client computers of participant users of the messaging systems. Messaging systems can also be incorporated in systems that that have minimal or no social network attributes. A messaging system can be provided by a short message system (SMS) text message delivery service of a mobile phone cellular network provider, or an email delivery system. Manager system 110 can include a messaging system in one embodiment. During a process of registration wherein a user of system 100 registers as a registered user of system 100, a user sending registration data can send, with permission data defining the registration data, a permission that grants access by manager system 110 to data of the user within social media system 140. On being registered, manager system 110 can examine data of social media system 140 e.g. to determine whether first and second users are in communication with one another via a messaging system of social media system 140. A user can enter registration data using a user interface displayed on a client computer device of client computer devices 120A-120Z. Entered registration data can include e.g. name, address, social media account information, other contact information, biographical information, background information, preferences information, and/or permissions data e.g. can include permissions data allowing manager system 110 to query data of a social media account of a user provided by social media system 140 including messaging system data and any other data of the user. When a user opts-in to register into system 100 and grants system 100 permission to access data of social media system 140, system 100 can inform the user as to what data is collected and why, that any collected personal data may be encrypted, that the user can opt out at any time, and that if the user opts out, any personal data of the user is deleted.

Manager system 110 can include an associated data repository 108. Data repository 108 can store various data. Data repository 108 can store data on users of system 100 such as registered users of system 100. On registration into system 100, manager system 110 can assign a universally unique identifier (UUID) to a new registered user. User data can include, e.g. contacts data of a user, permissions data of a user, preferences data of a user, and/or configuration data of a user. Users area 2121 can store data on products acquired by respective users of system 100, including tangible article products and service products. For example, on registration into system 110 a user may grant manager system 110 revocable rights to access purchase records of a user. Purchase records may be accessible e.g. from social media system 140 where social media system runs an online retail store process and/or a client computer device of client computer devices 120A-120Z associated to a user where a user's client computer device runs one or more online product purchasing application. Manager system 110 can be configured to maintain for registered users of system 100 an up to date product purchase history record for respective users.

Data repository 108 in decision data structures area 2122 can store decision data structures for use in return of action decisions provided by manager system 110. Action decisions that can be provided can include, e.g. action decisions for presentment of prompting data to a user that prompts a user to user interface in a certain way, thus accelerating operation of a user interface.

Data repository 108 and models area 2123 can store predictive models. Predictive models can include e.g. predictive models for use in return of action decisions provided by manager system 110. Predictive models stored in model area 2123 can include predictive models that are trained by use of machine learning. Manager system 110 can run various processes, such as browsing data examination process 111.

Manager system 110 running browsing data examination process 111 can include manager system 110 receiving and examining browsing data from a client computer device, such as client computer device 120A. Respective client computer devices 120A-120Z can include a browser plugin 2201 that reports client computer device browsing data to manager system 110. Client computer device browsing data can include e.g., (i) browser history data. (ii) browser session logging data, (iii) browser cookies, (iv) browser cache, and (v) browser usage data, as are described herein.

Manager system 110 running user activity classification process 112 can classify a current activity of a user in dependence on an examining of browsing data. Manager system 110 running user activity classification process can classify a current activity of a user as "authoring a product review, such as a product review of a physical article product or service product." According to one scenario, manager system 110 running a user activity classification process can classify a current activity of a user as "preparing to author a product review." Manager system 110 performing user activity classification process 112 can include manager system 110 classifying tasks of a user. Activities of a user can be determined using one or more task classification of a user.

Manager system 110 running web crawling process 113 can include manager system 110 sending web crawling commands to a plurality of web sites respectively operated by respective ones of enterprise systems 130A-130Z for return of review data such as product review data. According to one embodiment, manager system 110 performing web crawling process 113 can return for examination product review data from each of a plurality of different enterprise systems 130A-130Z. Enterprise systems of the respective enterprise systems 130A-130Z can include online retailers who make available products online and who permit reviews of their products available for acquisition.

Embodiments herein recognize that product review portals made available by different enterprise can comprise different characteristics. For example, one enterprise system can provide a product review portal that permits only an overall ranking of a product, e.g., on a one to five-star basis, and provides only a single data field for input by a user of specification data that specifies a review of the product. Another product review made available by a second enterprise can have different options and a different format. Product review data obtained from a plurality of different enterprises can be subject to natural language processing (NLP) by manager system 110 running of NLP process 114.

Manager system 110 can run NLP process 114 to process data for preparation of records that are stored in data repository 108 and for other purposes. Manager system 110 can run a natural language processing (NLP) process 114 for determining one or more NLP output parameter of a message. NLP process 114 can include one or more of a topic classification process that determines topics of messages and output one or more topic NLP output parameter, a sentiment analysis process which determines sentiment parameter for a message, e.g. polar sentiment NLP output parameters, "negative," "positive," and/or non-polar NLP output sentiment parameters, e.g. "anger," "disgust," "fear," "joy," and/or "sadness" or other classification process for output of one or more other NLP output parameters e.g. one of more "social tendency" NLP output parameter or one or more "writing style" NLP output parameter.

By running of NLP process 114, manager system 110 can perform a number of processes including one or more of (a) topic classification and output of one or more topic NLP output parameter for a received message (b) sentiment classification and output of one or more sentiment NLP output parameter for a received message or (c) other NLP classifications and output of one or more other NLP output parameter for the received message.

Topic analysis for topic classification and output of NLP output parameters can include topic segmentation to identify several topics within a message. Topic analysis can apply a variety of technologies e.g. one or more of Hidden Markov model (HMM), artificial chains, passage similarities using word co-occurrence, topic modeling, or clustering. Sentiment analysis for sentiment classification and output of one or more sentiment NLP parameter can determine the attitude of a speaker or a writer with respect to some topic or the overall contextual polarity of a document. The attitude may be the author's judgment or evaluation, affective state (the emotional state of the author when writing), or the intended emotional communication (emotional effect the author wishes to have on the reader). In one embodiment sentiment analysis can classify the polarity of a given text as to whether an expressed opinion is positive, negative, or neutral. Advanced sentiment classification can classify beyond a polarity of a given text. Advanced sentiment classification can classify emotional states as sentiment classifications. Sentiment classifications can include the classification of "anger," "disgust." "fear," "joy." and "sadness."

Manager system 110 running NLP process 114 can include manager system 110 returning NLP output parameters in addition to those specification topic and sentiment, e.g. can provide sentence segmentation tags, and part of speech tags. Manager system 110 can use sentence segmentation parameters to determine e.g. that an action topic and an entity topic are referenced in a common sentence for example.

Manager system 110 running NLP process 114 can include manager system 110 performing text segmentation to break down text into processable segments including sentence segmentation. Sentence segmentation refers to a process for dividing a string of written language into its constituent sentences. Sentence segmentation can be performed using punctuation. In the English language, sentence segmentation can be performed with use of a punctuation character. Discrimination techniques can be employed to identify instances in which a period character is not used as a sentence terminator (such as in abbreviations). According to one embodiment, sentence segmentation can be used to break down a block of text into a plurality of discrete sentences. Manager system 110 running NLP process 114, according to one embodiment, can perform segmentation processing to break down the block of text into a plurality of text segments, e.g. sentences and perform topic and sentiment NLP processing to extract one or more topic tag and one or more sentiment tag for each segment (for each sentence, according to one example). Manager system 110 running NLP process 114 can accumulate statistics on a plurality of product reviews by users of system 100 who can be registered users or unregistered users. For a given product, manager system 110 can provide results data that summarizes data on topics and sentiments observed for the product. Output data can include a data summary that specifies e.g. a percentage of reviews in which a certain topic is observed and an aggregate, e.g. average, and an aggregate sentiment score for the topic. Sentiment scores can be provided on a scale, e.g. of 0.0 to 1.0 where 0.0 is the lowest negative rating and a score of 1.0 is the highest positive rating, and the scoring value 0.5 is a neutral sentiment rating.

Manager system 110 running action decision process 115 can return an action decision based on examination of NLP data. Action decisions provided by manager system 110 running action decision process 115 can include action decisions to present prompting data to a user. According to one embodiment, manager system 110 can present prompting data to a user that prompts a user to include within a product review being authored by a user a topic determined to be associated to a product. For example, if more than a threshold percentage of reviews on a certain product include a certain topic, and the user has failed to comment on the certain topic, manager system 110 can present prompting data to the user prompting the user to input review data in respect to the certain topic. Manager system 110 running machine learning process 116 iteratively trains predictive models of model area 2123 based on using iteratively accumulated training data. The training data can include results data of user browsing sessions, according to one example. Additional features of system 100 are described with reference to the flow chart of FIG. 2A-2B which illustrates manager system 110 interoperating with client computer devices 120A-120Z, enterprise systems 130A-130Z, and social media system 140.

Figure 3:
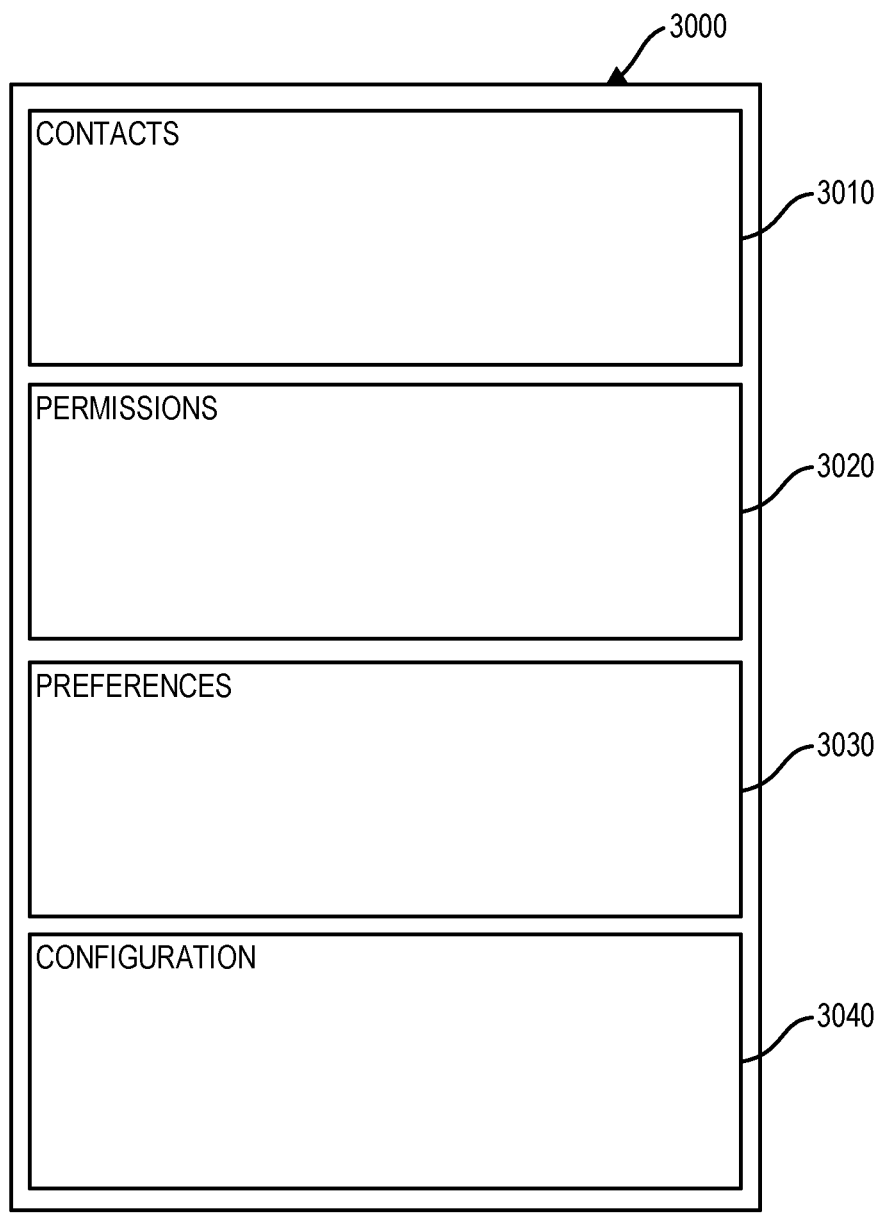
FIG. 3 depicts a user interface according to one embodiment.

At block 1201, client computer device 120A can be sending registration data for receipt by manager system 110 based on data inputs entered by a user of client computer device 120A into a user interface. FIG. 3 illustrates user interface 3000 for display on the user interface of client computer device 120A for use by a user in defining registration data. In area 3010, a user can enter contacts data, e.g. name, address, social media addresses, phone number, and the like. In permissions area 3020, a user can enter permissions that may allow access by manager system 110 to personal data of a user. Permissions data defined using permissions area 3020 can include, e.g. permissions to use data from client computer device 120A, e.g. browsing data of a user and permissions data allowing manager system 110 to access data from a social media account of a user within social media system 140. In preferences area 3030, a user can specify preferences of a user, e.g. sentiment likes and dislikes of a user. According to one embodiment, preferences area 3030 can display survey data which is responded to by user. Manager system 110 can process return data entered in response to a presented survey to extract preferences including likes and dislikes of a user in regard to a multitude of topics. In configuration area 3040, a user of client computer device 120A can enter configuration data that can be used to control performance of manager system 110, e.g. to determine what data sources to query, use interface display options, and the like.

In response to the receipt of the registration data, manager system 110 can, at block 1101, send/receive registration data to data repository 108 for storage by data repository at block 1081. In response to receipt of registration data, manager system 110 can designate the user as a registered user and can assign a Universally Unique Identifier (UUID) to the user. Data of the user can be associated to the UUID within users area 2121 of data repository 108. In addition to storing data on registered users, data repository 108 in users area 2121 can store data on unregistered user's system 100, such as users who are recognized by manager system 110 but who have not sent registration data to manager system 110.

In response to registering a user, manager system 110 at block 1102 can send an installation package to client computer device 120A for receipt and installation on client computer device 120A at installation block 1202. The installation package received and installed at block 1202 can include e.g., libraries and executable code to facilitate the functioning of client computer device 120A in system 100. The installation package can include e.g., software code to define browser plugin 2201 as described in FIG. 1. Browser plugin 2201 can facilitate the reporting of client computer devices 120A-120Z of browsing data, which browsing data can include e.g., (i) browser history data, (ii) browser session logging data, (iii) browser cookies, (iv) browser cache, and (v) browser usage data, as are described herein. The installation package installed at block 1202 also facilitates user interface features such as, for example, a user interface window that can be displayed to user on a display of client computer device 120A for presentment of prompting data to a user. In response to completion of block 1102, manager system 110 can proceed to block 1103.

At block 1103, manager system 110 can send query data to social media system 140 for access of social media account data of the user if permitted by permissions data of the user. In response to the receipt of the social media data sent at block 1401 by social media system 140, manager system 110 at block 1104 can send social media data to data repository 108 for storage by data repository 108 at block 1082. Stored social media data can include, e.g. raw social media data such as raw text and pictures from a social media account of a user and/or can include structured data such as data tags extracted from raw social media data, e.g. by running of NLP process 114. Stored data extracted from social media data can include product purchase data of a user for storage into users area 2121 of data repository. Purchase records may be accessible e.g. from social media system 140 where social media system runs an online retail store process and/or a client computer device of client computer devices 120A-120Z associated to a user where a user's client computer device runs one or more online product purchasing application. Manager system 110 can be configured to maintain for registered users of system 100 an up to date product purchase history record for respective users. In response to completion of block 1104, manager system 110 can proceed to block 1105.

At block 1105, manager system 110 can send query data to client computer device 120A in response to the received query data. Client computer device 120A at block 1203 can send user data to manager system 110. In response to the received user data, manager system 110 can send at block 1106 received user data to data repository 108 for storage by data repository 108 at store block 1083. User data stored at block 1083 can include, e.g. browsing data and other user data obtained from client computer device 120A that can be obtainable by manager system 110 based on permissions of a user such as the location history of a user, calendar data of a user, and other data of the user. The user data can include e.g. product purchase records data from one or more online product purchasing application that is installed and running on client computer device 120A. Purchase records may be accessible e.g. from social media system 140 where social media system runs an online retail store process and/or a client computer device of client computer devices 120A-120Z associated to a user where a user's client computer device runs one or more online product purchasing application. Manager system 110 can be configured to maintain for registered users of system 100, an up to date product purchase history record for respective users. The user data stored at block 1083 can include raw user data or structured user data such as data return by subjecting raw user data to processing by NLP process 114. In response to completion of block 1106, manager system can proceed to block 1107. At block 1107, manager system 110 can be receiving browsing data that can be iteratively sent by client computer device 120A at block 1204.

Figure 5:
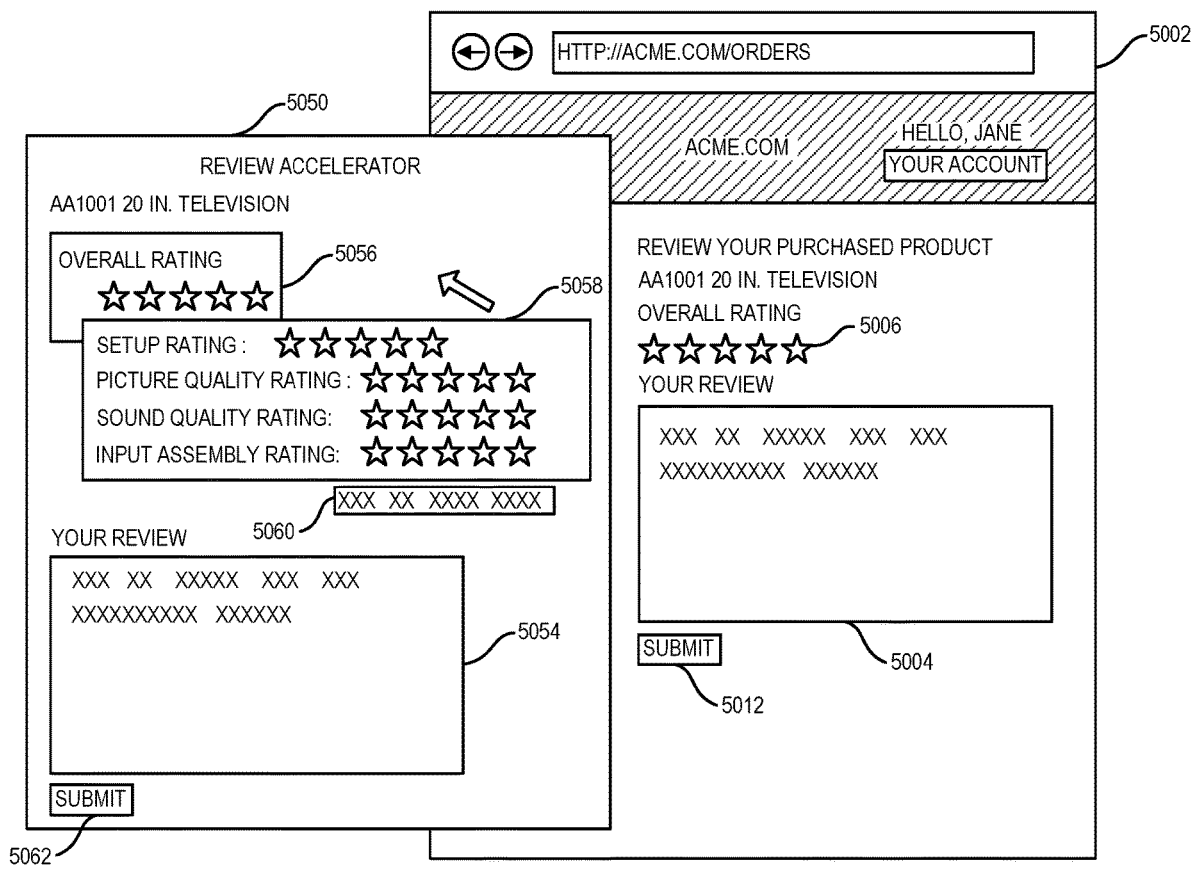
FIG. 5 depicts user interface defined by a webpage in combination with a window that can be displayed on a client computer device according to one embodiment.

At block 1204 a user can be browsing webpages served by one or more system of enterprise systems 130A-130Z and/or manager system 110 which can provide a service portal serving a webpage such as webpage 5050 as shown in FIG. 5 for entry of product review data. While browsed webpages browsed by a user are rendered on a display of client computer device 102A, client computer device 120A for providing browsing data can send at block 1204, by browser plugin 2201 (FIG. 1), content of rendered webpages rendered on client computer device 120A to manager system 110. There is set forth herein a method wherein the method includes receiving registration data from the user and in response to the receiving registration data from the user, sending to the client computer device 120A a client computer device installation package having software code which when installed on the client computer device installs the browser plugin 2201 on a web browser of the client computer device 120A, wherein the web browser renders on a display of the client computing device 120A webpage data served by a computing node based system external to the computing node based manager system 110 and wherein the browser plugin is configured to forward data of the rendered webpage data to the computing node based manager system 110, wherein the data of the rendered webpage data defines content of the user browsing data obtained by the computing node based system.

In examining block 1107, manager system 110 can be examining browsing data received on the sending of browsing data at block 1204. Examining of browsing data at block 1107 can include manager system 110 classifying current user activity of a user. User activity classifications can be based on type of website visited by a user, as well as webpages viewed within websites that are visited as well as website button clicks of a user within websites. Website types can include, e.g. online purchase websites, personal banking websites, product research websites, and social media websites. Based on the examining performed at block 1107, manager system 110 at block 1108 can perform classifying of a current activity of a user. A classification of current activity of user can be dependent on user tasks that are being performed and/or which have recently been performed by the user. By the examining of browsing data at block 1107 manager system 110 can extract, by natural language processing, data items specifying any new product acquisitions of a user during a current browsing session of client computer device 120A. Further, with the sending of browsing data at block 1204, client computer device 120A can be sending product purchase data from any online purchase applications of client computer device 120A for examination by manager system 110 at block 1107. Further at a time of block 1204, social media system 140 can be sending user purchase data from an online retail store process running on social media system 140. Manager system 110 can update purchase history records stored in user area 2121 to include most recently available transaction records made available during a current web browsing session of client computer device 120A.

Further referring to the flowchart of FIG. 2, client computer device 120A at block 1204 can be reporting browsing data for receipt and examination by manager system 110 at block 1107. Based on the examination of the browsing data, manager system 110 can perform classification at block 1108 of an activity of a user, and at block 1109 can determine whether a criterion has been satisfied at block 1109. Browser plugin 2201 of client computer device 120A can be sending browsing data to manager system 110 at block 1204. Browsing data can include data in various browsing data categories such as (i) browser history data, (ii) browser session logging data, (iii) browser cookies, (iv) browser cache, and (v) browser usage data. Browser session logging data can be maintained by client computer device 120A and can include a log of commands executed by a browser during a browsing session. In one aspect, browser session logging data can include a record of unique websites visited.

Browser usage data of category (v) can include e.g. browsing data not included in the browsing data classifications of (i)-(iv) herein. For example, browser usage data can include webpages received from website hosting servers of enterprise systems 140A-140Z that are visited by a user which are not cached. Browser usage data can also include webpage form field data, e.g. text based content entered into forms by user of client computer device 120A. Browser usage data can also include a record of button activations of a user, e.g. shopping cart button activations when interacting with the displayed webpage. According to one embodiment, browser plugin 2201 for sending browser usage data of classification (v) can forward each webpage received by client computer device 120A that is rendered on client computer device 120A to manager system 110 at block 1204. In response to received webpages at examination block 1107, manager system 110 can process the webpage without rendering the received webpages, e.g. by subjecting received webpages to natural language processing at examination block 1107. It has been described herein that manager system 110 with use of predictive model 6002 can predict whether a user is preparing to author a product review.

For determining a current user activity classification, manager system 110 can examine browsing data that indicates that a certain action of a user has occurred. According to one example, manager system 110 at blocks 1107 and 1108 can examine browsing data to determine whether the user has e.g. clicked a button of a user interface of client computer device 120A to commence authoring a product review. The browsing data (including e.g. browser usage data in such a situation) can reference a product and can reference a "write a product review" website button. Based on the user clicking on a "write a product review" website button, manager system 110 at block 1108 can return the classification of the user task classification of "authoring product review" and can also return a product identifier for the product for which the review is being written. Browsing data can be subject to natural language processing for extraction of an entity topic specifying a product identifier. Unique product identifiers in common usage include Global Trade Item Numbers (GTINs), International Standard Book Number (ISBN), Manufacturer Part Numbers (MPNs), and brand names. Where the product identifier is not unique, manager system 110 can query appropriate mapping data resources so that the product is correctly identified. Manager system 110 can subject received browsing data to natural language processing by NLP process 114 in order to return entity topics, including product entity topics, and website buttons to facilitate identification of user tasks and product identifiers.

For determining a classification of user activity in some embodiments, manager system 110 can query a predictive model 6002 stored in models area 2123 of manager system 110. Referring to predictive model 6002, predictive model 6002 can be iteratively trained with the use of training data which training data can include successive iterations of user browsing data which is received and examined at block 1107. Examining of browsing data at block 1107 can include storing of such browsing data into data repository 108. Training data for training predictive model 6002 can include iteratively applied training data wherein each iteration of training data comprises a task sequence at time period n in combination with a task sequence at time period n+1. With each new iteration of training data, time period n can be advanced. Trained as described predictive model 6002 can learn a relationship between a current task sequence and a subsequent task sequence such as the next task sequence. Thus, for example, with use of predictive model 6002, manager system 110 can learn and respond to a demonstrated user behavior of the user that prefaces the user's authoring a product review online. Take, for example, a user who exhibits the browsing behavior pattern of always visiting a personal banking website and then a social media website prior to authoring a product review. Predictive model 6002 can be trained to recognize the pattern of visiting a personal banking website and then a social media website as behavior prefacing authoring a product review and in response to the behavior being exhibited can classify a current computer device activity of the user as "preparing to author a product review".

Predictive model 6002, once trained, is able to respond to query data. Query data for querying predictive model 6002 can include a current task sequence of a user, e.g. as may be mapped to website visited and website buttons activated in one example. When predictive model 6002 is queried with query data defined by a current task sequence, predictive model 6002 is able to output a predicted subsequent task sequence of a user based on the training data that has been applied to predictive model 6002. Manager system 110 can use predictive model 6002, trained as described, at examining block 1107. For example, at examination block 1107, manager system 110 can query predictive model 6002 with data defining a current task sequence of the user and can then examine output by predictive model 6002 in response to the query data. The output data can be a predicted subsequent task sequence. If the predicted subsequent task sequence output by predictive model 6002 includes the task e.g. of clicking a website "write a product review" button, manager system 110 at examining block 1107 can determine that a predicted subsequent task of the user is preparing to author a product review and accordingly can determine that the user is currently engaged in the activity of preparing to search for a service provider.

Predictive model 6002, on the return of a classification of user activity of "preparing to author a product review" (which refers to activity of a user prior to authoring a product review) can accelerate operation of the described user interface, e.g. including by proactively commencing a web crawl so that extracted data from other reviews is available for use prior to a time the user commences authoring of a product review.

Embodiments herein recognize that multiple classifications of user activity can be returned at block 1108. For example, user activity can be classified as being (a) inactive, (b) arbitrary browsing (browsing activity unrelated to a product review), (a) preparing to author a product review, or (d) authoring a product review as may be determined by e.g. monitoring of website button clicks or by a recognized entity domain matching a list of signature entity domains. According to one example, the identification of a "write a product review" website button click by a user, or the identification of the entity topic extracted using natural language processing of <entity topic>="product review form", can return the classification of current user activity as (d) "authoring product review".

At block 1109, manager system 110 can determine that a criterion has been satisfied. In one example, the criterion can be that that targeted classification e.g., (c) "preparing to search for service provider" has been satisfied. In one example, the criterion can be that the targeted classification e.g. (d) "searching for service provider" has been satisfied. In one example, the criterion can be that at least one of the targeted classifications e.g., (c) "preparing to search for service provider" or (d) "searching for service provider" has been satisfied. If manager system 110 at block 1109 determines that a criterion has not been satisfied, manager system 110 can return to receive and examine for classification additional browsing data. It will be seen that manager system 110 can iteratively perform the loop of blocks 1107-1109 to iteratively perform examination and classification using new iterations of obtained browsing data until a condition is satisfied. It will be seen that manager system 110 can be iteratively updating a current classification of user activity while manager system performs the loop of blocks 1107-1109. Where manager system 110 at block 1109 determines that a criterion is satisfied, manager system 110 can proceed to block 1110.

Manager system 110 can iteratively perform the loop of blocks 1107-1109 until the criterion is satisfied at block 1109. With each iteration of the loop of blocks 1107-1109, manager system 110 can examine new browsing data received by the sending of browsing data by client computer device 120A at block 1204. In response to the determination that a criterion has been satisfied at block 1109, manager system 110 can proceed to block 1110.

According to one embodiment, manager system 110 can be configured so that for each different classification within the described activity classifications (a)-(d), manager system 110 can select a different sending process for sending browsing data from client computer device 120A to manager system 110. When manager system 110 determines during an iteration of block 1108 that there is a new activity level classification for a current user, manager system 110 can appropriately send a communication to client computer device 120A to activate a browsing data sending process that is associated to the new classification. Manager system 110 can be configured to activate a browsing data sending process according to the decision data structure of Table A.

TABLE A

| Row | User Activity Classification | Browsing Data Sending Process |
|---|---|---|
| 1 | (a) "inactive" | Process A |
| 2 | (b) "browsing unrelated to a product review" | Process B |
| 3 | (c) "preparing to author a product review" | Process C |
| 4 | (d) "authoring a product review" | Process D |

Manager system 110 can be configured so that additional classifications of browsing data can be enabled for each successive descending row of the decision data structure of Table A. As set forth herein, categories of browsing data can include: (i) browser history data, (ii) browser session logging data, (iii) browser cookies, (iv) browser cache, and (v)

browser usage data. According to one embodiment, when process A is active, only browsing data in category (i) and (ii) may be enabled for transmission. When process B is active, only browsing data categories (i), (ii), and (iii) can be enabled for transmission. When process C is active, only browsing data of categories (i), (ii), (iv) and (v) can be enabled for transmission. When process D is active, only browsing data of categories (i), (ii), (iv) and (v) can be enabled for transmission. When process D is active, browsing data of each of the categories (i), (ii), (iv) and (v) can be enabled for transmission. Thus, when manager system 110 by appropriate communication to client computer device 120A activates a new browsing data transmission process corresponding to a next descending row of Table A, manager system 110 can increase rate at which browsing data is sent and received, e.g. in bits per second (bps). The respective browsing data sending processes associated to Rows 1-4 can further have respectively increasing transmission frequencies. By reason of the described transmission frequency functionality and/or the described browsing data category functionality where additional categories are enabled for transmission in descending rows of Table A, transitioning to a new browsing data sending process associated to a descending row, and increase a rate at which browsing data is transmitted from client computing device 120A to enterprise system. Intelligently controlling a rate of browsing data transmission (e.g. increasing a rate when certain activity is detected to selectively facilitate more granular examination of activity) conserves computing resources on the sending end and receiving end.

At block 1110, manager system 110 can send web crawling command data to enterprise systems 130A-130Z for return of product review data in which product review data can be responsively sent by enterprise systems 130A-130Z in response to the query data at block 1301. Enterprise systems 130A-130Z can be online vender enterprises that provide product review portals. Embodiments herein recognize that different enterprises can provide different product review portals. For example, the first enterprise system can provide a review portal that permits a user to specify only a single overall rating and which provides a single text field for entry of text data in which review of a product is specified. A second portal can be differently configured.

Manager system 110 at block 1110 can specify within sent web crawling command data one or more product identifier (e.g. Global Trade Item Numbers (GTINs), International Standard Book Number (ISBN), Manufacturer Part Numbers (MPNs), brand names and the like). In the case the triggering condition of block 1109 was the observing of the activity classification of (d) authoring a product review, the one or more product identifier can include product identifier extracted by natural language processing from a webpage having a "write product review" website button clicked on or recognized for triggering classification of an activity of the user as authoring a product review. In the case the triggering condition of block 1109 was the observing of the activity classification of (d) preparing to author a product review, the one or more product identifier can include product identifiers for all products purchased by the user within a time window of the current time, as determined by examining purchase history data of users area 2121 of data repository 108. The time duration associated to the time window can be predetermined or adaptively determined. Embodiments herein recognize that operation of a user interface can be accelerated by pre-sending a user data in anticipation of a user's future use.

Figure 4:
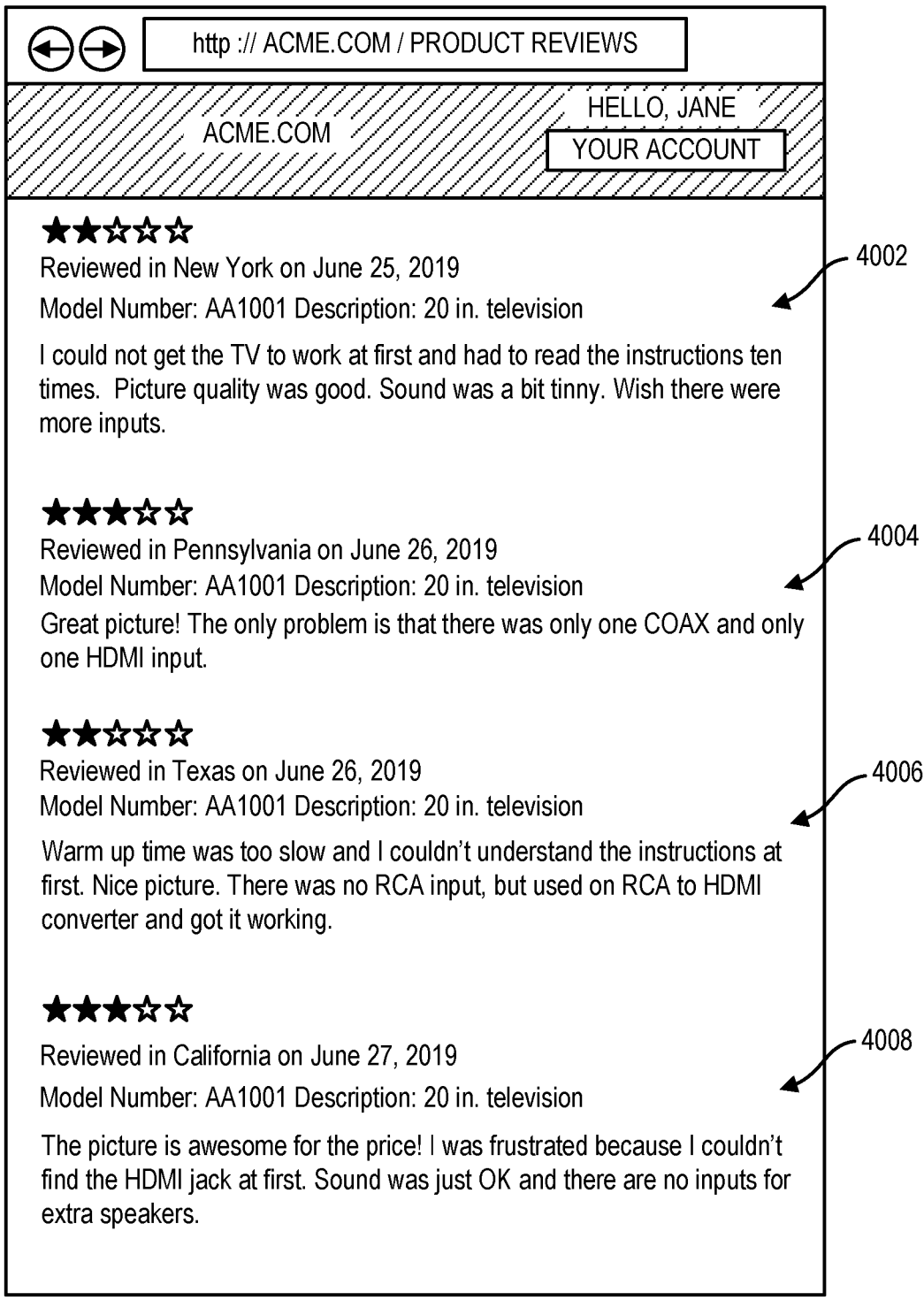
FIG. 4 depicts a product review portal hosted by an enterprise system according to one embodiment.

On receipt of the review data sent at block 1301, manager system 110 can proceed to block 1111. At block 1111, manager system 110 can perform examining of received review data sent at block 1301 for one or more product associated to one or more product identifier sent at block 1109. For examining a received review data, manager system 110 can activate NLP process 114 so that received review data is subject to NLP processing for extraction of NLP output data such as NLP topic tags and NLP sentiment tags. FIG. 4 illustrates exemplary product reviews of users other than the current user that can be subject to examining block 1111. Reviews 4002, 4004, 4006, and 4008 are text based reviews written by different users other than the current user who is using client computer device 120A. Referring to blocks 1110 and 1111 manager system 110, web crawling and examining by manager system 110 can be performed on an on-demand basis with economization of computing resources. While results can be archived in data repository 108, the on demand functionality (where e.g. crawling can be performed on demand and can be limited to products identified by one or a limited number of product identifiers) can avoid a need for large storage volumes. The functionality described with reference to predictive model 6002 where manager system 110 can predict that a user is about to author a product review before authoring commences can provide manager system 110 the ability to usefully mine a large amount of data with minimal risk that user can perceive any delay. In one aspect, predictions using predictive model 6002 can be performed so that mined crowdsourced data for a product can be accumulated prior to a user commencing authoring of a product review so that the mined data is available for use at a time that review authoring commences. For performing web crawling at block 1110 in one embodiment, manager system 110 can crawl websites according to a list of top N websites that provide review portals for the product category of the identified product. Manager system 110 in data repository 108 can store top N website lists for multiple product categories.

At block 1110, manager system 110 can send web crawling command data to obtain reviews 4002, 4004, 4006, and 4008 from a first enterprise system and can obtain different sets of reviews from additional enterprise systems. In the review portal shown in FIG. 4, the user has only a single area to enter text specifying attributes of a product and a user can specify only a single overall 5-star rating. Other review portals of other enterprise systems can have different configurations that are differentiated from the format specified in FIG. 4 pertaining to a certain one enterprise system that provides a product review portal.

Topic tags that can be applied with respect to text defining the reviews 4002, 4004, 4006, and 4008 are summarized in Table A hereinbelow where review 1 corresponds to review 4002, where review 2 corresponds to review 4004, where review 3 corresponds to review 4006, and review 4 corresponds to review 4008.

TABLE A

| Review | Sentences with topic and sentiment tags |
|---|---|
| 1 | I could not get the TV to work at first and had to read the instructions ten times. [topic = setup]; [Sentiment = 0.2] Picture quality was good. [topic = picture quality]; [Sentiment = 0.8] Sound was a bit tinny. [topic = sound quality]; [Sentiment = 0.2] Wish there were more inputs. [topic = input assembly]; [Sentiment = 0.1] |
| 2 | Great picture! [topic = picture quality]; [Sentiment = 0.9] |

TABLE A-continued

| Review | Sentences with topic and sentiment tags |
|---|---|
|  | The only problem is that there was only one COAX and only one HDMI input. [topic = input assembly]; [Sentiment = 0.2] |
| 3 | Warm up time was too slow and I couldn't understand the instructions at first. [topic = setup]; [Sentiment = 0.2] Nice picture. [topic = picture quality]; [Sentiment = 0.7] There was no RCA input, but used an RCA to HDMI converter and got it working. [topic = input assembly]; [Sentiment = 0.2] [topic = setup]; [Sentiment = 0.2] |
| 4 | The picture is awesome for the price! [topic = picture quality]; [Sentiment = 0.8] I was frustrated because I couldn't find the HDMI jack at first. [topic = input assembly]; [Sentiment = 0.1] Sound was just OK and there are no inputs for extra speakers. [topic = sound, input assembly]; [Sentiment = 0.2]; |
| ... | ... |

For processing of the various reviews, manager system 110 can activate NLP process 114 to segment text defining the reviews. In Table A, a sentence based segmentation is illustrated, i.e. sentence segmentation where text is separated into different sentences. Manager system 110 with reference to Table A can associate data tags to respective sentences defining a review. In Table A, there can be associated one or more topic tag and one or more sentiment tag to respective sentences defining a review. For example, referring to review 1, the first sentence is "I could not get the TV to work at first and had to read the instructions 10 times." In the referenced sentence, manager system 110 running NLP process 114 can return the NLP topic tag of Topic=Setup, and the NLP sentiment tag of Sentiment=0.2 which indicates a negative sentiment according to the described sentiment scoring value where the sentiment scoring value 0.0 is the lowest negative sentiment score, and the scoring value 1.0 is the highest positive sentiment score.

At block 1111, manager system 110 can be examining e.g. tens, thousands, or millions of reviews which can be accumulated from a plurality of different enterprise system websites. According to another aspect, manager system 110 can use summarized data summarized by examining block 1111 for return of action decisions. Table B illustrates a data summarization that can be performed by manager system 110 at examining block 1111.

Referring to Table B, manager system 110 can store, in data repository 108, a table that summarizes a review by multiple users for different products.

subject to review activity at block 1107 and for which text based reviews are described in reference to FIG. 4, Table A.

Regarding Row 1, product AA1001, a 20-inch television, and with reference to hypothetical illustrative data can be determined by the examining at block 1111 to have been subject to 9,876 reviews. In those reviews, as summarized in Table B, the topic "setup" was observed in 21% of the reviews, the topic "picture quality" was observed in 77% of the reviews, the topic "sound quality" was observed in 42% of the reviews, the topic "input assembly" was observed in 67% of the reviews, the topic "wall mount" was observed in 12% of the reviews, and the topic "remote" was observed in 18% of the reviews. According to data summarization Table B, aggregate sentiment can be ascertained for each of the identified topics. Manager system 110 can ascertain an aggregate topic, e.g. by averaging sentiment scores for reviews in which topic was observed or by applying a weighted average or by providing an average after filtering out identified extraneous values.

As set forth in Row 1 of Table B, the topic "setup" can have an aggregate sentiment value of 0.20 (negative sentiment). The topic "picture quality" can have an aggregate sentiment of 0.71 (positive sentiment). The topic "sound quality" can have an aggregate of 0.22 (negative sentiment). The topic "input assembly" can have an aggregate sentiment of 0.18 (negative sentiment). The topic "wall mount" can have an aggregate sentiment of 0.93 (positive sentiment). The topic "remote" can have an aggregate sentiment of 0.48 (neutral sentiment). In the described example, sample sentiment values below a low threshold of 0.3 can be classified as being negative sentiments. Sentiment values above a high threshold of 0.7 can be classified as being positive sentiments.

Based on the examining of review data at block 1111, which can include providing NLP output tags, as illustrated in Table A, and statistical summary data as illustrated in Table B, manager system 110 can proceed to action decision block 1112 for manager system 110 provides an action decision. An action decision provided at block 1112 can be an action decision to present prompting data to a user. The prompting data can prompt a user to enter certain input data when authoring a product review. Further description of a prompting feature is set forth in reference to FIG. 5. Initially, at the time of performance of block 1107, according to one embodiment, the user of client computer device 120A can be

TABLE B

| Row | Product | Type | Number of Reviews | Topics |
|---|---|---|---|---|
| 1 | AA1001 | 20 in. television | 9,876 | setup = 0.21, sentiment = 0.20; picture quality = 0.77, sentiment = 0.71; sound quality = 0.42, sentiment = 0.22; input assembly = 0.67, sentiment = 0.18; wall mount = 0.12, sentiment = 0.93 remote = 0.18, sentiment = 0.48 |
| 2 | AC5112 | Toaster | 612 | Controls = 0.44, sentiment = 0.21; Slots = 0.34, sentiment = 0.14; Speed = 0.78, sentiment = 0.88 |
| ... | ... | ... | ... | ... |

In Row 1 of Table B, there is summarized data for the product AA1001 which is the product determined to be authoring a product review using text based data entry field area 5004 of webpage 5002 which can be a webpage for ordering a product (which webpage can have the review portal defined by text based data entry field area 5004 and star rating area 5006). A user can fill in text specifying a product review using text based data entry field area 5004 and can specify a star rating using star rating area 5006. A user, for example, can use a cursor to click on one star, two stars, three stars, four stars, or five stars and can then enter in text based data entry field area 5004 any text that describes the product being reviewed. In some embodiments where it is determined that there is insufficient data to return an action decision at block 1115, manager system 110 can return to block 1107 to examine a next iteration of browsing data. Thus, it is seen that manager system 110 can iteratively perform the loop of blocks 1107 to 1112 until an action decision is rendered at block 1112. According to one scenario, manager system 110 at an earlier iteration of decision block 1109, can proceed to block 1110 on the basis of the user current activity classification being the classification (c) preparing to author a product review, and at a subsequent iteration of decision block 1109, can proceed to block 1110 on the basis of the user current activity classification being the classification (d) authoring a product review.

Webpage 5002 can be a product ordering webpage, such as the webpage used to order the product subject to review in the review portal. The user can activate the review portal, e.g. by selecting a "review past orders" feature available within webpage 5002. The user using webpage 5002 to complete a product review can be detected by manager system 110 as being product review activity by manager system 110 at blocks 1107 and 1108. If authoring of a review using the review portal defined by text based data entry field area 5004 and star rating area 5006, window 5050 provided by a webpage served by manager system 110 can be displayed with webpage 5002 on a display of a client computer device such as client computer device 120A.

In the case that a detected product review activity is (c) "preparing to author a product review" rather than an active classification of (d) authoring a product review, authoring window 5050 (or multiple instances of such window for multiple products) can be displayed without display of webpage 5002 (that is, webpage 5002 may not have been accessed vet by a user). Window 5050 can be displayed without display of webpage 5002 in other situations, e.g. where user decides to access a webpage served by manager system 110 which serves a service review portal defined by window 5050 without using a vendor provided portal. System 100 can be configured so that a user of client computer device 120A can enter product review data using one or more of vender product review portals defined by text based data entry field area 5004 and area 5006 (an overall product star rating form), and a service product review portal served by manager system 110 provided by window 5050 defined by a webpage. A vendor product review portal can be a product review portal made available by an enterprise that provides online acquisition of products. A service product review portal can be a product review portal made available by manager system 110 which facilitates user interface accelerator services as set forth herein.

Regarding window 5050, window 5050 can be a window for presentment of prompting data to a user who is authoring a product review. According to one embodiment, manager system 110 can transition window 5050 from an undisplayed state to a displayed state on return of an action decision determined at block 1112. In action decision, return of block 1112 can be an action decision that determines one or more characteristic of prompting data presented to a user who is authoring a product review. According to one embodiment, action decisions for presentment of prompting data can be determined with use of a decision data structure stored in decision data structures area 2122 of data repository 108. Table C illustrates an action decision data structure that can be stored in decision data structures area 2122.

TABLE C

| Row | Browsing mode | Review Stage | Condition 1 | Condition 2 | Action Decision |
|---|---|---|---|---|---|
| 1 | Vendor Portal | zero words | Topic referenced in T > 0.60 percent of reviews | — | A |
| 2 | Service Portal | at least five words | Topic referenced in T > 0.70 percent of reviews | Topic not referenced in current review of user | B |
| 3 | Vendor Portal | at least five words | Topic referenced in T > 0.60 percent of reviews and sentiment strength is less than 0.3 or greater than 0.7. | Purchase has aged beyond K days | C |
| 4 | Vendor Portal | at least twenty words; duration at least five minutes | Sentiment strength is less than 0.2 or greater than 0.8. | | D |
| 5 | Service Portal | Review complete (submit button clicked) | Sentiment strength is less than 0.2 or greater than 0.8. | | E |
| 6 | Vendor Portal | Review complete (submit button hovered and at least twenty words) | Sentiment strength is less than 0.2 or greater than 0.8. | | F |
| ... | ... | ... | ... | ... | ... |

Regarding Table C, the browsing mode column indicates the portal in which the current product review was commenced, e.g. vender portal defined by webpage 5002 or service portal provided by window 5050 defined by a rendered webpage. Embodiments herein recognize that different prompting strategies may be favored in dependence on whether authoring a review has commenced with use of a vendor portal or a service portal. The review stage indicates the stage of the current review currently being authored. Various stages are possible, e.g. zero words, at least five words, at least 20 words, at least 5 minutes in duration (as may be determined referencing a real time clock of client computer device 120A), star rating form fill and so forth. Embodiments herein recognize that performance of prompting data can be optimized by control of a stage in which the prompting data is presented. Rows and columns defining prompting conditions can be established manually by an administrator user and/or user of a client computing device of client computing devices 120A-120Z or automatically by machine learning processes in which combinations are tested and optimized based on accumulated performance data. Embodiments herein recognize, e.g. that some users may prefer light guidance in performing a review and some users may prefer significant guidance. Accordingly, user configuration of prompting data firing conditions can be made possible using configuration area 3040 of FIG. 3. Various action decisions can be defined based on the process specified in the action decision column of Table C. Action decisions can include action decisions to present certainly defined prompting data in one or more area of window 5050. Embodiments herein recognize that the decision data structure of Table C can be configured so that a first classification of prompting data can be presented to a user at the onset of a review (it may be presented on clicking of a "write product review" button), a second classification of prompting data is presented at an early stage of a review, e.g. when three words have been typed into a user interface, a third classification of prompting data can be presented at an intermediate stage of the review (e.g. when ten words have been typed in) and a third classification of prompting data is presented on completion of a review (e.g. as may be indicated by a submit button being activated, or alternately, hovered).

Regarding window 5050, window 5050 can have various features. Window 5050 can include text based data entry field area 5054 which allows user to enter text data specifying a review in free form. Window 5050 can include area 5056 which allows a user to specify an overall rating for a product and window 5050 can include area 5058 which presents a component feature which allows a user to specify component feature star ratings for component features for which star ratings are available.

In one aspect, system 100 can be configured so that prompting data is presented to cause awareness of missed topics of a user to thereby provide an accelerated and more accurate review. As indicated by Row 3, the presentment of selected prompting data can be conditioned on a threshold time having been exceeded from the time of purchase of a product for which a review is being authored. For providing such functionality, manager system 110 can examine timestamps associated to historical purchase data stored in users area 2121 of data repository. Embodiments herein recognize that for aged purchases, certainly configured prompting data may be particularly helpful in terms of triggering memory recall.

In one exemplary use case, a user may be authoring a product review for a certain product and may be focusing on a first feature of the product mapping to a first extracted topic (e.g. picture quality). However, manager system 110, by mining a large corpus of crowdsourced review data from multiple users as shown in Table B, can determine that the larger population (the community) regards second and third features of the product (mapping to second and third extracted topics) to be important. In such a scenario, manager system 110 can present prompting data e.g. in area 5058 and/or area 5060 that prompts the user to enter review data regarding the second and third features. Embodiments accordingly provide accelerated review and use of the defined user interface because the user no longer has to waste time mentally retracing experiences to recall missed features of the product. A more accurate review is authored because the user is prompted to review a more complete set of features.

Manager system 110 can be configured so that an extracted topic extracted from product reviews appears in an area of window 5050 if the topic was observed in more than a threshold percentage of product reviews. Referring to the crowdsourced mined data for the product identified by the identifier "AA1001" of Table B, the topics specified in area 5058 of FIG. 5 can be displayed in the case the threshold percentage is 0.20. However, if the threshold percentage was selected to be 0.60 with reference to the product identified by the identifier "AA1001", only picture quality rating and input assembly rating would appear in area 5058. Conversely, if the threshold were lowered, e.g. if a threshold of 0.10 were used, area 5058 would include star ratings for additional topics mapping to product component features, namely the topic of wall mount and the topic of remote. By increasing the threshold percentage that triggers display of prompting data, manager system 110 can selectively present prompting data more commonly indicated as being important to a larger portion of the crowdsourced users.

Referring to area 5060 of window 5050, area 5060 can display text data to a user that prompts a user to take a specified action. For example, area 5060 can display text that prompts the user to enter text describing a feature of the product under review that maps to a topic that has not yet been written about by the user using text based data entry field area 5054. For such functioning, manager system 110 can be configured so that manager system 110 iteratively subjects text defining a current review of a product being authored by the user to processing by NLP process 114 so that manager system 110 keeps a running track of topics that have been observed and extracted from a current review. With such processing, manager system 110 is able to discern that a current textual review by a user is absent reference to a topic determined by manager system 110 to be of interest to users of system 100 other than the current user, which users can be registered users and/or unregistered users. By the iterative subjecting of text being authored by a user while it is being authored by natural language processing, manager system 110 can dynamically present prompting data to a user which indicates whether a topic of interest to a community of users has been referenced in user authored text. According to one illustration, at the onset of review still referring to the example of the identifier "AA1001" of Table B, area 5060 can be displaying the text: "Do you want to say anything about setup? Do you want to say anything about picture quality? Do you want to say anything about sound quality? Do you want to say anything about input assembly?" The user can then type a set of words specifying a problem with the picture quality of the television. Manager system 110, prior to the review being completed, can extract the topic of picture quality from the user's text using natural language processing and can update the text displayed in area 5060 to read: "Thank you for the comment about the picture quality. Do you want to say anything about setup? Do you want to say anything about sound quality? Do you want to say anything about input assembly?" The process can continue with manager system 110 updating the displayed text of area 5060 in real time as the user enters text. If the user deletes text, manager system 110 can re-present the prior prompting data prompting entry of review content having a topic of the user deleted text. The user can complete the review by clicking a submit button 5012, 5062. The review of the user is therefore accelerated because the user's recollection about the user's experience is more effectively recalled. In one embodiment, manager system 110 can display, in area 5060, any defined data for prompting a user. In one embodiment, manager system 110 can display, in area 5060, all of the text in Row 1 of Table B.

Referring again to Table C, the decision data structure Table C can specify various action decisions that are dependent, e.g. on whether a topic has been referenced in more than a threshold percentage of reviews and other conditions such as the condition that another topic has been referenced (or not referenced) in a current review of a user. Certain rows of the action decision Table C can be fired in dependence on sentiment strength. For example, the action decision of Row 3 is fired only when a topic referenced in the set of reviews as summarized in Table B has been observed in more than a threshold percentage of the reviews and the sentiment strength of that topic is less than 0.3 (negative sentiment) or greater than 0.7 (positive sentiment). Row 4 can be fired if sentiment strength of a topic is less than 0.2 or greater than 0.8 without reference to percentage of reviews attribute of the topic. Embodiments herein recognize that prompting data can be tuned with use of firing conditions that reference a combination of parameters with specified values, where the first parameter is a percentage of review parameter that specifies a percentage of community reviews for a product that reference a certain topic, and the second parameter is a sentiment strength parameter.

Regarding the decision data structure of Table C, an authored review can be regarded to be complete when a user takes action to attempt to submit a review, such as by activating or hovering a cursor or finger above submit button 5012 of webpage 5002, or submit button 5062 of window 5050. According to one embodiment, area 5058 and/or area 5060 of window 5050 can be maintained in an undisplayed state until a time that a user indicates completion of an authored review, e.g. by hovering a cursor or a finger above submit button 5012 or 5062 or activating such button, and then prompting data prompting text referencing missed product features of the user mapping to topics can be displayed. In such an embodiment, the display of the described prompting data can be avoided altogether if the user manages to type text on all topics associated to prompting data for display by configuration data of Table C controlling prompting functions. Maintaining prompting data in an undisplayed state until a review is completed can avoid over-reliance on displayed prompting data and can encourage a user to recall all attributes of a product so as to avoid being presented with prompting data.

According to one embodiment, if a user is completing a review in the review portal of webpage 5002, system 100 can be configured so that text entered in text based data entry field area 5004 is automatically populated and mirrored into text based data entry field area 5054. System 100 can also be configured so that if a user is completing a review using window 5050, data entered into the review portal of window 5050 is automatically populated into the review portal of webpage 5002. Client computer device 120A can be configured to include automated cut and paste functionality to provide such featurization.

In response to return of an action decision of block 1112, manager system 110 can proceed to block 1113. At block 1113, manager system 110 can send prompting data for presentment on a user interface of a display of client computer device 120A, such as the user interface defined by webpage 5002 and/or window 5050 as shown in FIG. 5. The prompting data can include, e.g. display data of area 5056, area 5058, and/or area 5060 of window 5050 as shown in FIG. 5. In response to the receipt of prompting data sent at block 1113, client computer device 120A can present the prompting data at block 1205. In response to completion of block 1205, client computer device 120A can proceed to block 1206. At block 1206, client computer device 120A can iteratively send user interface (UI) data for receipt by manager system 110. The UI data can comprise any input data entered by user with use of the user interface defined by webpage 502 and/or window 5050. In response to the receipt of the UI data sent at block 1206, manager system 110 can proceed to block 1114.

At block 1114, manager system 110 can determine whether a review has been sent. For determining whether a review has been sent, manager system 110 can determine whether a review has been submitted, e.g. by activation of submit button 5012 or submit button 5062 for submission of a review. Prior to a review being sent by submission thereof, manager system 110 can be iteratively performing blocks 1111, 1112, 1113, and 1114 until a time that a submit button has been activated. By the iterative performance of blocks 1111, 1112, 1113, 1114, manager system 110 can be iteratively sending prompting data for display on a user interface of client computer device 120A and can be iteratively receiving UI data input by a user. In examining block 1111, manager system 110 can be examining received review data that was sent at block 1301 and can also be examining UI data entered by user, e.g. can be subjecting entered text defining entered UI data by a user to NLP processing by running of NLP process 114 for extraction of topics and sentiments of user authored review text while the text is being authored and prior to completion of a review.

Thus, manager system 110 can dynamically and iteratively prompt a user while a product review is being authored in dependence on text data defining the review to that point. According to one scenario with reference to the data set described in Tables A, B, and C, a user can be authoring a product review regarding the "AA1001 20-inch television", referenced in Table B, and can reference such features as setup, picture quality, and sound quality, but the user's review at a certain stage and development of the review can be absent of text defining the topic of "input assembly". Manager system 110 can dynamically detect if the review in that stage of authoring is absent of text referencing the input assembly topic and can accordingly present prompting data, e.g. in area 5060, so that the user is prompted to define text in respect to the input assembly feature. On the determination that a product review has been sent and submitted at block 1114, manager system 110 can proceed to action decision block 1115.

At action decision block 1115, manager system 110 can return an action decision to report review data defining the just completed review. Embodiments herein recognize that text and star ratings defining a just completed review authored by a user can be reported for archiving in a variety of useful ways. According to one embodiment, manager system 110 can maintain website allowing community user access to reviews that are supported by manager system 110. In such a website operated by manager system 110, sentiment data extrapolated and associated to respective topics of different reviews can be expressed in terms of topic specific star ratings, thus adding topic specific star rating content to review data currently absent of star rating. For example, an observed sentiment rating of sentiment=0.2 can be converted into a 1 star rating presented in graphics data. An observed sentiment rating of sentiment=0.4 can be converted into a 2 star rating presented in graphics data and so forth.

The action decision returned at block 1115 can use a decision data structure that references configuration data defined by the user or administrator user who configures manager system 110. According to one embodiment, manager system 110 at block 1116 based on an action decision at block in addition to the action decision to post a review to a website operated by manager system 110 can send autofill command data for receipt by client computer device 120A. On receipt of the autofill command data sent at block 1116, client computer device 120A can perform text autofilling and can send at block 1207 autofill text data for receipt and storage by the appropriate enterprise system of enterprise systems 130A-130Z at block 1302. By the described autofill data transmission as described, client computer device 120A, according to one embodiment, can auto-copy and paste user defined text data entered into window 5050 into a form appropriate for data entry into a review portal defined by webpage 5002. The data transmission at block 1207 can include client computer device 120A by automated cut and paste functionality emulating manual operations of a user using webpage 5002 to enter product review data. According to one embodiment, text entered into text based data entry field area 5054 of window 5050 can be copied into text based data entry field area 5004 of the product review portal defined by webpage 5002.

Prompting data described with reference to FIG. 5 can have prompting features relating to star ratings. Embodiments herein recognize that product reviews can comprise star ratings, and that presentment of a star rating form can assist a user in authoring a product review. Embodiments herein recognize that vendor portals can offer only single star form, permitting only an overall product rating. Prompting data of area 5058 of window 5050 can include the depicted star rating form that prompts a user to enter star ratings for product features identified by manager system 110 as being referenced in community reviews. By presenting the star reviews across a plurality of feature topics, a user can be prompted to not overlook any topic.

In the performance of the described text autofill operations of block 1207, star ratings entered by user in window 5050 with use of area 5058 having star rating forms for different topics can be converted into text that is entered as part of the text of text based data entry field area 5004 of the product review portal defined by webpage 5002. For example, a star rating of 1 or 0 per setup rating in area 5058 can be expressed as the text "setup was difficult." Further, a 5-star picture quality rating entered by a user using area 5058 of window 5050 can be expressed as text in text based data entry field area 5004 as the text "picture quality was excellent," and so forth. By the described conversion, functionality accuracy of a review can be improved in that a user may use service portal webpage defining window 5050, which a user most familiar with to complete a review and the review data can be adapted into a format of a vendor portal without the user having to learn the vendor portal format. In such a use case, service portal webpage defining window 5050 can be used as a tool for entry of review data into one or more vendor portal having a unique format different than that of window 5050.

Figure 2A:
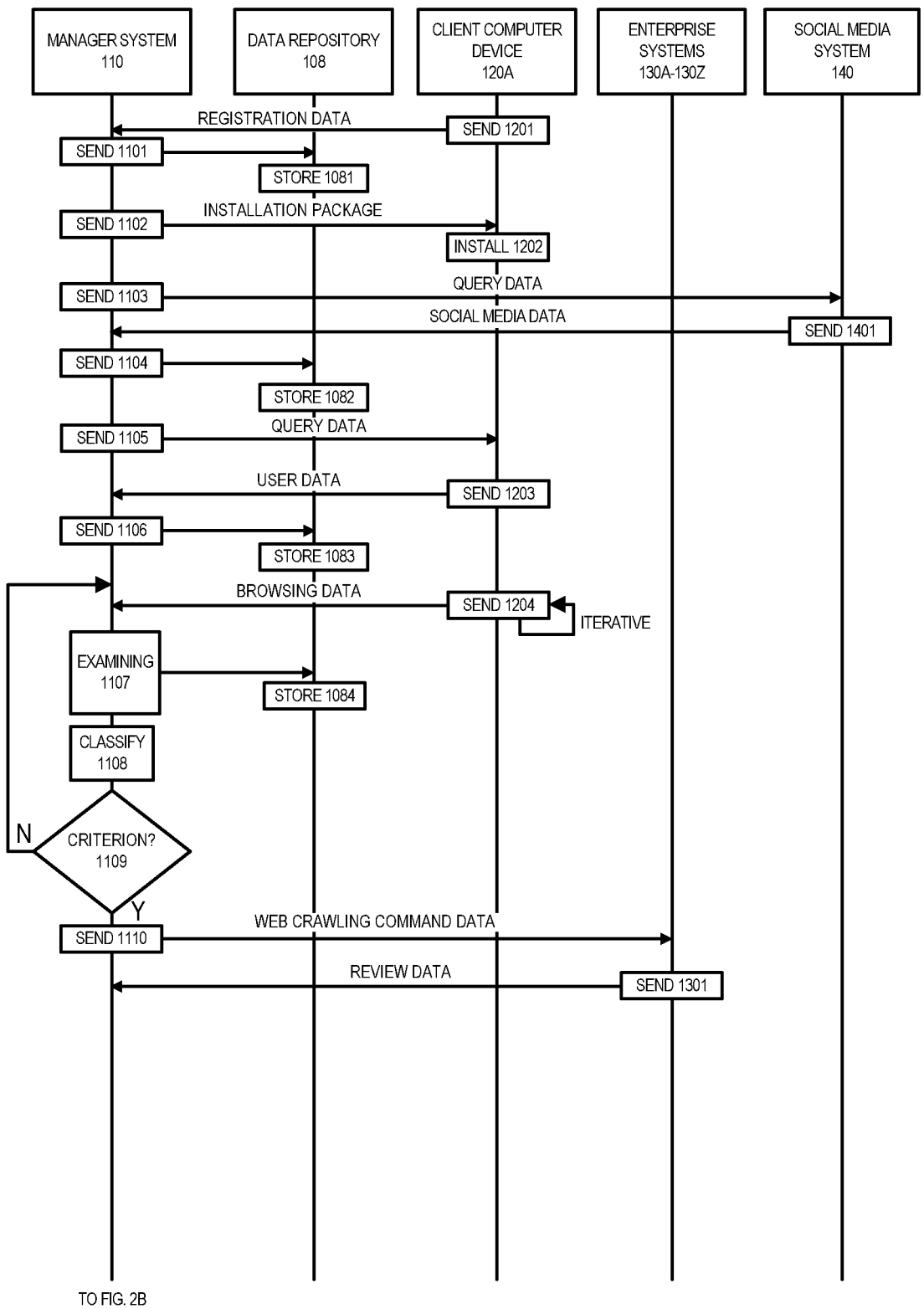
FIGS. 2A-2B are a flow chart illustrating a method for performance by manager system interoperating with client computer device, enterprise systems, and a social media system according to one embodiment.
Figure 2B:
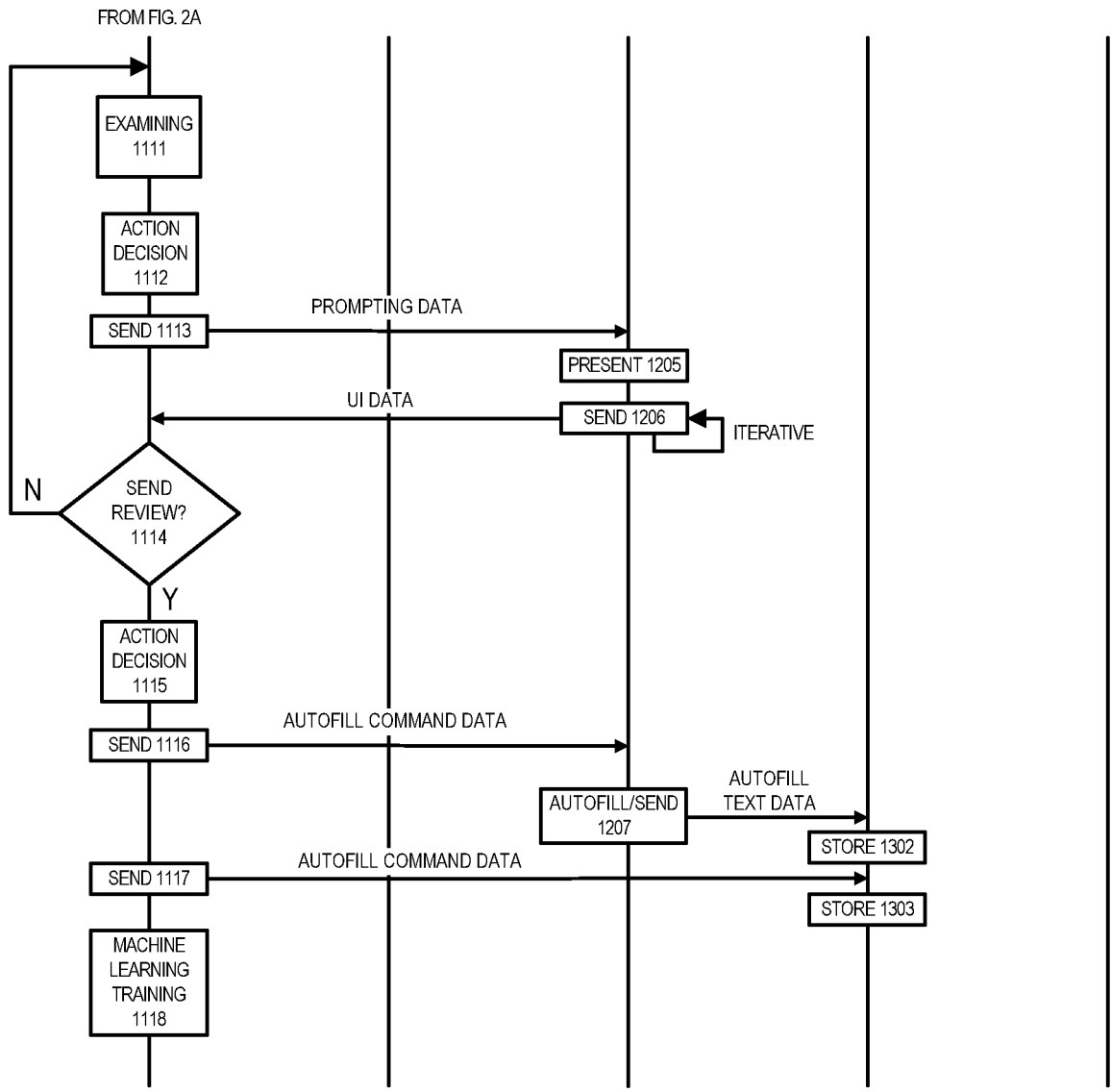
Figure 6:
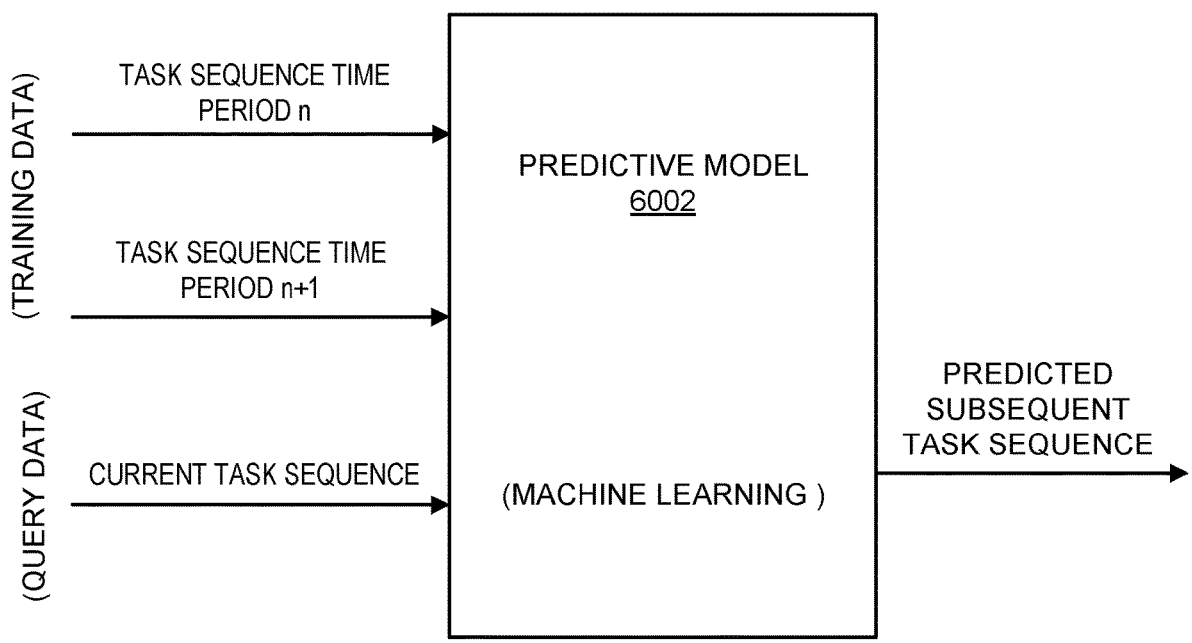
FIG. 6 depicts a predictive model that can be used for return of action decisions according to one embodiment.

Referring to the flow chart of FIG. 2A-2B, send block 1117 expresses the alternative wherein autofill command data is sent directly from manager system 110 based on received and examined UI inputs of a user to the appropriate enterprise system of enterprise systems 130A-130Z for storage by the appropriate enterprise system at block 1303. On completion of block 1117, manager system 110 can proceed to block 1118. At block 1118, manager system 110 can perform machine learning training to train predictive models that have been stored in data repository in model area 2123 based on observed and recorded data of a just completed review session. According to one example, predictive model 6002, as shown in FIG. 6, can be iteratively trained with machine learning training data to ascertain that a user is preparing to author a product review.

Referring to predictive model 6002, predictive model 6002 can be iteratively trained with the use of training data, which training data can include successive iterations of user browsing data which is received and examined at block 1107. Examining of browsing data at block 1107 can include storing of such browsing data into data repository 108 indicated by storage block 1084. Training data for training predictive model 6002 can include iteratively applied training data wherein each iteration of training data comprises a task sequence at time period n in combination with a task sequence at time period n+1. With each new iteration of training data of time, period N is advanced. Trained as described predictive model 6002 can learn a relationship between a current task sequence and a subsequent task sequence such as the next task sequence. Thus, for example, with use of predictive model 6002, manager system 110 can learn and respond to a demonstrated user behavior, wherein the user who always visits a personal banking website and then a social media website prior to authoring a product review, so that the next time a behavior prefacing authoring of a product review will be recognized by manager system 110 as activity defining preparing to author a product review.

Predictive model 6002, once trained, is able to respond to query data. Query data for querying predictive model 6002 can include a current task sequence of a user. When predictive model 6002 is queried with query data defined by a current task sequence, predictive model 6002 is able to output a predicted subsequent task sequence of a user based on the training data that has been applied to predictive model 6002. Manager system 110 can use predictive model 6002, trained as described, at examining block 1107. For example, at examining block 1107, manager system 110 can query predictive model 6002 with data defining a current task sequence of the user and can then examine output by predictive model 6002 in response to the query data. The output data can be a predicted subsequent task sequence. If the predicted subsequent task sequence output by predictive model 6002 includes the task of authoring a product review, manager system 110 at examining block 1107 can determine that a predicted subsequent task of the user is authoring a product review and accordingly can determine that the user is currently engaged in the review activity of preparing to author a product review.

Various available tools, libraries, and/or services can be utilized for implementation of predictive model 6002. For example, a machine learning service can provide access to libraries and executable code for support of machine learning functions. A machine learning service can provide access to a set of REST APIs that can be called from any programming language and that permit the integration of predictive analytics into any application. Enabled REST APIs can provide e.g. retrieval of metadata for a given predictive model, deployment of models and management of deployed models, online deployment, scoring, batch deployment, stream deployment, monitoring and retraining deployed models. According to one possible implementation, a machine learning service provided by IBM® WATSON® can provide access to libraries of APACHE® SPARK® and IBM® SPSS® (IBM® WATSON® and SPSS® are registered trademarks of International Business Machines Corporation and APACHE® and SPARK® are registered trademarks of the Apache Software Foundation. A machine learning service provided by IBM® WATSON® can provide access set of REST APIs that can be called from any programming language and that permit the integration of predictive analytics into any application. Enabled REST APIs can provide e.g. retrieval of metadata for a given predictive model, deployment of models and management of deployed models, online deployment, scoring, batch deployment, stream deployment, monitoring and retraining deployed models. Training predictive model 6002 can include use of e.g. support vector machines (SVM), Bayesian networks, neural networks and/or other machine learning technologies.

Often times users find themselves shopping on e-commerce websites and looking at the reviews. The problem with reviews is they tend to be automatic at high level (average), so it's hard to rate specific individual components of a given product. Input could be ascertained but getting users to rate N number of sub-products or features on a product or service is often tedious. A solution is easier for the reviewer and the user analyzing posted reviews.

There is set forth herein defining and aggregating sub entities across reviews via text processing and present these artifacts visually in an e-commerce format, i.e. sub-component-based review extraction and derivation for different users.

There is set forth herein such components as: (1) Capture user input into free-response fields: (2) apply known language processing functionalities to derive entities and semantic score of those entities; (3) Retrieve the known sub entities attribute score and apply these to the product/service review via star methodology or other transaction methodology for ranking.

According to one embodiment document processing and aggregation can be used over a series of documents (reviews) to find frequent mentioned topics and the semantic score of these topics. The score will then be provided in a 1-5 star type e-commerce review method to assist the user.

Embodiments herein can employ a cross search/scrape manual for these sub-components to validate that a metric is present. Embodiments herein can allow user voting/input to determine if a sub-component is an actual entity. Embodiments herein can allow an e-commerce site to remove sub-components from view. Embodiments herein can utilize natural language processing to derive attributes written in different ways. Embodiments herein can be adapted to show the most relevant/digestible sub-components.

An embodiment description is as follows: (1) A commerce site and users have opted in to integrated sub review module. (2) A user writes a typical product or service review via free form text and an overall star rating. The freeform text review will mention different components or parts of the reviewed product such as sub features or other conditionals. (3) The review is received by the commerce review processing engine and the engine begins processing this and all other available reviews. The review engine processes all reviews using a document discovery tool to process topic entities, intents, and the semantic score surrounding each entity. (4) The topic entities are organized and processed in a hierarchical manner in terms of which entities are mentioned the most and which entities are physical or abstract (physical entities can be assigned higher priority). (5) The topic entities are processed and cross checked. Is it predefined (able to be rated separately), and is it unrelated (shipping). (6) If the rating is pre-defined modify the rating by deriving semantic score in the same format (% or 1-5) as the current review. (7) If the rating is not pre-defined, capture the overall sentiment of the semantic score in the desired format for the review (% or 1-5) and generate a visual artifact and list this sub artifact's individual score under the overall average score.

There is set forth herein a method for initial ranking metrics. Initial scores can be applied to the structured components through existing sentiment recognition technologies.

According to one embodiment, initial scores to the sub-reviews can be initialized based on the intensity of the sentiment of reviews. For e.g. "Engine is great! I really like how quiet it is, but seats are so-so" (4.0/5.0, 2.5/5.0). "When sitting down it's a bit uncomfortable, but this thing zooms!" (−0.2/5.0, +3.5/5.0). "I really like the engine." (4.5/5.0). "These chairs are so frustrating!" (−1.0/5.0).

Embodiments herein can include a vocabulary expansion mechanism: All the sub-reviews entities can be expanded to broad classes using vocabulary expansion.

According to one embodiment (step 1) a user can provide a first few seed words. For e.g. a group of sub-reviews containing words related to camera lens: "lens". "camera" the vocabulary generator (step 2) takes in the seed words and recommends similar words from the vocabulary: "lens", "camera", "vision", "phone camera", "pixels", "resolution" and (Step 3) the user can select some of the words from the recommended words and add them to the sub-reviews' bag of words, and rejects some-user can add new ones too! "lens", "camera", "vision", "pixels", "resolution", "canon" etc. Using vocabulary expansion similar words can be collected into the same bag and broader sub-review classes can be generated.

Certain embodiments herein may offer technical computing advantages, including computer systems to address the problems arising in the realm of computer systems. Embodiments herein can include user interface acceleration features for accelerating the operation of a user interface, e.g. for product review form filling. Embodiments herein, for example, can autodetect that a user is preparing to author a product review and can responsively and automatically present to a user prompting data that prompts a user to author the review in a certain way. Embodiments herein can predict that a user is about to commence authoring a product review and can complete web crawl and data mining processing prior to authoring commencing so that prompting data is available to guide a user in authoring a product review at the onset of authoring. For reduction of computing resource consumption, embodiments can dynamically adjust browsing data transmission processes in dependence on a detected activity of the user so that additional categories of browsing data can be sent under certain activity conditions. Prompting data for prompting a user in authoring a product review can include prompting data that accelerates recall by the user of the user's experience with the product being subject to review. Embodiments herein can employ crowdsourced data, namely data accumulated from a plurality of users who may be registered users and unregistered users who have reviews products online. The crowdsourced data can be subject to processing by Natural Language Processing to extract a plurality of data tags such as topic data tags and/or sentiment data tags. The data tag text data defining a review, according to one embodiment, can be subject to sentence segmentation, and respective sentence segments can be tagged with topic data tags and/or sentiment data tags. Prompting data provided by described embodiments can include dynamic prompting data that dynamically changes in dependence on content of a text data defined by text data defining review. Embodiments herein can include iteratively subjecting text data defining a review being authored by a user to natural language processing for dynamic output of topic tags and sentiment tags. The prompting data that can be dynamically presented to a user can be in dependence on data tags applied to reviews by other users as well as data tags associated to an in-progress review currently being authored by a user. A fundamental aspect of operation of a computer system is its interoperation with entities to which it interfaces including human actors. By increasing the accuracy and reliability of information presented to human users, embodiments herein increase the level of engagement of human users for enhanced computer system operation. Various decision data structures can be used to drive artificial intelligence (AI) decision making, such as decision data structures that drive decisions regarding the presentment of prompting data. Decision data structures as set forth herein can be updated by machine learning so that accuracy and reliability is iteratively improved over time without resource consuming rules intensive processing. Machine learning processes can be performed for increased accuracy and for reduction of reliance on rule based criteria and thus reduced computational overhead. For enhancement of computational accuracies, embodiments can feature computational platforms existing only in the realm of computer networks such as artificial intelligence platforms, and machine learning platforms. Embodiments herein can employ data structuring processes, e.g. processing for transforming unstructured data into a form optimized for computerized processing. Embodiments herein can examine data from diverse data sources such as data sources that process radio signals for location determination of users. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making. Certain embodiments may be implemented by use of a cloud platform/data center in various types including a Software-as-a-Service (SaaS). Platform-as-a-Service (PaaS). Database-as-a-Service (DBaaS), and combinations thereof based on types of subscription.

A system of one or more computers can be configured to perform particular operations or actions by virtue of having software, firmware, hardware, or a combination of them installed on the system that in operation causes the system to perform the actions. One or more computer programs can be configured to perform particular operations or actions by virtue of including instructions that, when executed by data processing apparatus, cause the apparatus to perform the actions. One general aspect includes a computer implemented method including: obtaining user browsing data from a browser plugin of a client computer device, the client computing device being associated to the user: examining the user browsing data; classifying a current activity of the user in dependence on the examining the user browsing data, where the classifying includes classifying the current activity of the user as searching for a service provider; in response to classifying the current activity of the user as searching for a service provider, performing web crawling on multiple websites to obtain research data, where the multiple websites are crawled by the performing web crawling in dependence on extracted data extracted by the examining the user browsing data; and providing an action decision in dependence on the research data, where the action decision includes a decision to transmit a communication to the user on behalf of a certain service provider. Other embodiments of this aspect include corresponding computer systems, apparatus, and computer programs recorded on one or more computer storage device, each configured to perform the actions of the methods.

Implementations may include one or more of the following features. The computer implemented method where the action decision is in dependence on a multi-factor scoring formula, the multi-factor scoring formula including a profitability factor, a service provider urgency factor, and a service consumer urgency factor. The computer implemented method where the examining data of the user browsing data includes extracting a price and a product identifier of a product from webpage data browsed by the user. The computer implemented method where the examining data of the user browsing data includes using natural language processing to extract a price and a product identifier of a product from webpage data browsed by the user. The computer implemented method where the method includes in response to receiving registration data from the client computer device sending a client computer device installation package for to the client computer device for installation on the client computer device and in response to receiving registration data from a service provider system associated to the certain service provider sending a service provider installation package to the service provider system for installation on the service provider system, where the method includes receiving first data from the client computer device, the first data being made accessible by the client computer device installation package after installation of the client computer device installation package on the client computer device, where the method includes receiving second data from the service provider system, the second data being made accessible by the service provider installation package after installation of the service provider installation package on the client computer device, where the providing the action decision in dependence on the research data includes providing the action decision in dependence on the first data and the second data. The computer implemented method where the method includes iteratively performing the obtaining, the examining, and the classifying of the current activity of the user, and iteratively adjusting a browsing data transmission process by which the client computer device transmits the user browsing data for facilitation of the obtaining of the user browsing data, where the iteratively adjusting of the browsing data transmission process is in dependence on a current outcome of the classifying of the current activity of the user. The computer implemented method where the method includes receiving registration data from the certain service provider and in response to the receiving sending to a computing node based system of the certain service provider an installation package having software code which when installed on the computing node based system facilities access to inventory data and cost data of the computing node based system so that the providing an action decision includes providing the action decision in dependence on the inventory data and cost data. The computer implemented method where the method includes, based on the examining, identifying a current classification of activity of the user as preparing to search for a service provider, where the method includes, in response to the identifying a current classification of activity of the user as preparing to search for a service provider and prior to the classifying the current activity of the user as searching for a service provider, triggering a making of a network connection between the client computer device of the user and a website of the certain service provider. The computer implemented method where the obtaining, examining and classifying are performed by a computing node based manager system external to the client computing device, where the method includes receiving registration data from the user and in response to the receiving registration data from the user, sending to the client computer device a client computer device installation package having software code which when installed on the client computer device installs the browser plugin on a web browser of the client computer device, where the web browser renders on a display of the client computing device webpage data served by a computing node based system external to the computing node based manager system and where the browser plugin is configured to forward data of the rendered webpage data to the computing node based manager system, where the data of the rendered webpage data defines content of the user browsing data obtained by the computing node based system. The computer implemented method where the method includes, based on the examining, identifying a current classification of activity of the user as preparing to search for a service provider, where the method includes, in response to the identifying a current classification of activity of the user as preparing to search for a service provider and prior to the classifying the current activity of the user as searching for a service provider, triggering a making of a network connection between the client computer device of the user and a website of the certain service provider, and where the identifying a current classification of activity of the user as preparing to search for a service provider includes querying a predictive model that has been trained by machine learning with training data that includes historical browsing data of the user. The computer implemented method where the method includes, based on the examining, identifying a current classification of activity of the user as preparing to search for a service provider, where the method includes, in response to the identifying a current classification of activity of the user as preparing to search for a service provider and prior to the classifying the current activity of the user as searching for a service provider, sending a communication to the client computer device that increases a rate at which the client computer device transmits the user browsing data to one or more computing node performing the examining and the classifying. The computer implemented method where the examining data of the user browsing data includes subjecting content of the user browsing data to natural language processing to extract a price and a product identifier of a product from a website of a particular service provider that provides online retail services, and where the crawling on multiple websites to obtain research data in respect to a service searched for by the user includes performing natural language processing to extract from webpages of enterprises who are competitors of the particular service provider and the certain service provider prices of products identified by the product identifier. The computer implemented method where the examining data of the user browsing data includes subjecting content of the user browsing data to natural language processing to extract a price and a product identifier of a product from a website of a particular service provider that provides online retail services, and where the crawling on multiple websites to obtain research data in respect to a service searched for by the user includes performing natural language processing to extract from webpages of enterprises who are competitors of the particular service provider and the certain service provider competitor prices of the product identified by the product identifier, where the action decision is in dependence on a multi-factor scoring formula, the multi-factor scoring formula including a profitability factor, a service consumer urgency factor, and a service provider urgency factor, where the method include, for evaluating the profitability factor determining a candidate offer for sending to the user by the certain service provider, where the determining the candidate offer includes using the competitor prices of the product identified by the product identifier. The computer implemented method where the examining data of the user browsing data includes extracting a price and a product identifier of a product from webpage data browsed by the user, where the providing an action decision includes querying a predictive model to return an output specifying a predicted acceptance price of the user, where the predictive model has been trained with machine learning training data derived by processing historical browsing data of the user to learn of the user's behavior in response to the user identifying an initial price for a product, where the method includes transmitting the communication to the user on behalf of a certain service provider, the communication including a text based notification including text that specifies the product identifier and a second price for the product, where the second price has been determined in dependence on the output specifying a predicted acceptance price of the user. The computer implemented method where the examining data of the user browsing data includes extracting a price and a product identifier of a product from webpage data browsed by the user, and where the action decision is in dependence on a multi-factor scoring formula, the multi-factor scoring formula including a profitability factor, a service provider urgency factor, and a service consumer urgency factor, where the service provider urgency factor is in dependence on: (a) a determination of whether the product is overstocked by the certain service provider, and (b) a determination of whether the product is in season, and where the service consumer urgency factor is in dependence on (i) an ascertaining of a rate of social media posts of the user in respect to consumer products using natural language processing to process social media data of the user, and (ii) an ascertaining of the user's preference level for the product using natural language processing to process social media data of the user. The computer implemented method where the examining data of the user browsing data includes extracting a price and a product identifier of a product from webpage data browsed by the user, where the method includes transmitting the communication to the user on behalf of a certain service provider, the communication including a text based notification including text that specifies the product identifier and an offered price for the product, where the method includes subsequent to the extracting, examining further browsing data of the user to ascertain a rate with which the user visits different online retailer service provider websites subsequent to the extracting during a current browsing session of the client computer device, and in response to the ascertained rate exceeding a threshold updating notification data presented to the user so that the user is presented with new text that specifies an updated price. Implementations of the described techniques may include hardware, a method or process, or computer software on a computer-accessible medium.

Figure 7:
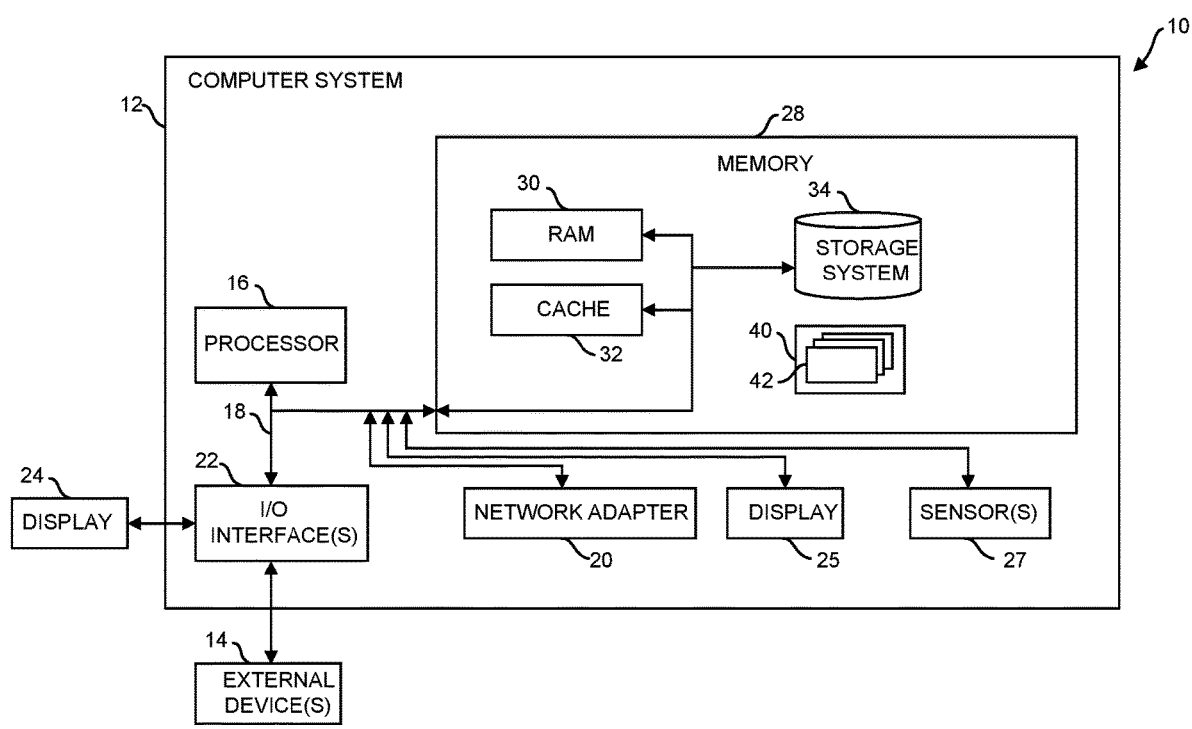
FIG. 7 depicts a computing node according to one embodiment.
Figure 8:
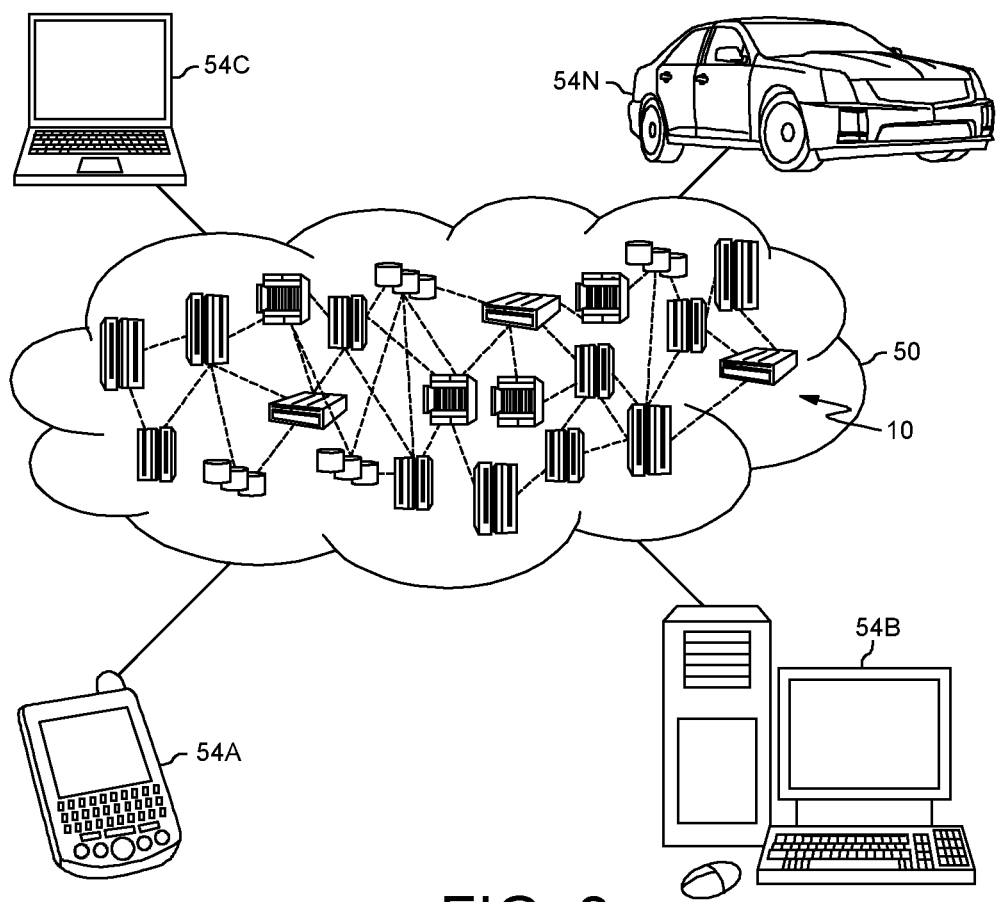
FIG. 8 depicts a cloud computing environment according to one embodiment.
Figure 9:
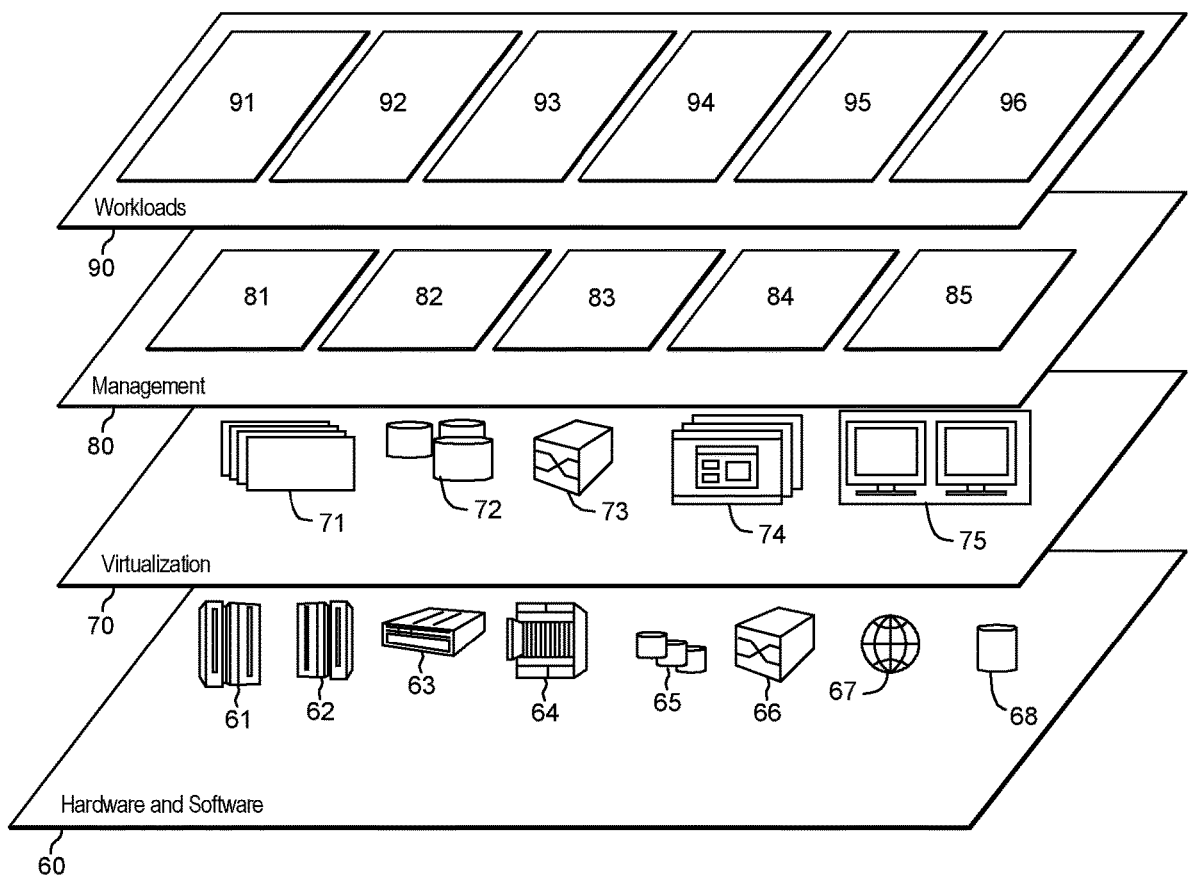
FIG. 9 depicts abstraction model layers according to one embodiment.

FIGS. 7-9 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 7, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 7, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 8-9.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, manager system 110 can include one or more computing node 10 and can include one or more program 40 for performing described with reference to manager system 110 as set forth in the flowchart of FIGS. 2A-2B. In one embodiment, one or more client computer device 120A-120Z can include one or more computing node 10 and can include one or more program 40 for performing functions described with reference to one or more client computer device 120A-120Z as set forth in the flowchart of FIGS. 2A-2B. In one embodiment, enterprise systems 130A-130Z can include one or more computing node 10 and can include one or more program 40 for performing functions described with reference to enterprise systems 130A-130Z as set forth in the flowchart of FIGS. 2A-2B. In one embodiment, social media system 140 can include one or more computing node 10 and can include one or more program 40 for performing functions described with reference to social media system 140 as set forth in the flowchart of FIGS. 2A-2B. In one embodiment, the computing node based systems and devices depicted in FIG. 1 can include one or more program for performing function described with reference to such computing node based systems and devices.

Computer system 12 may also communicate with one or more external devices 14 such as a keyboard, a pointing device, a display 24, etc.: one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 8 computing node 10 is described as being implemented in a cloud computing environment and accordingly is referred to as a cloud computing node in the context of FIG. 8.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61: RISC (Reduced Instruction Set Computer) architecture based servers 62: servers 63; blade servers 64: storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for processing text based data e.g. review data and presentment of prompting data as set forth herein. The processing components 96 can be implemented with use of one or more program 40 described in FIG. 7.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
examining user browsing data from a client computer device, the client computing device being associated to a user;
determining a current activity classification of the user in dependence on the examining user browsing data from the client computer device;
in response to the current activity classification satisfying a criterion, performing web crawling to obtain crowdsourced product review data of one or more product, the crowdsourced product review data comprising data from product reviews by multiple reviewers other than the user and including data from reviews from multiple product review sites;
subjecting the crowdsourced product review data to natural language processing for extracting data tags associated to respective product reviews of the crowdsourced product review data;
determining prompting data in dependence on the extracting data tags associated to respective product reviews of the crowdsourced product review data; and
communicating the prompting data to the user, the prompting data guiding the user in an authoring of a product review of a certain product, wherein the method includes ascertaining, based on natural language processing extracted topic tags, whether a percentage of crowdsourced product reviews respecting the certain product accumulated within a corpus that specify a certain topic has satisfied a threshold percentage of crowdsourced product reviews, and responsively to determining that the percentage of crowdsourced product reviews respecting the certain product accumulated within the corpus that specify the certain topic has satisfied the threshold percentage of crowdsourced product reviews, providing the prompting data so that the prompting data prompts the user to enter text based review data into a user interface relating to the certain topic.

2. The computer implemented method of claim 1, wherein the method includes in response to the current activity classification of the user being determined to be the classification of preparing to author product review and prior to the user commencing authoring of the product review, performing the web crawling to obtain crowdsourced product review data of one or more product.

3. The computer implemented method of claim 1, wherein the method includes analyzing product purchase history data of the user stored in a data repository, wherein the method includes in response to the current activity classification of the user being determined to be the classification of preparing to author product review and prior to the user commencing authoring of the product review, performing the web crawling to obtain crowdsourced product review data of the certain product, the certain product being determined based on the analyzing product purchase history data of the user stored in the data repository.

4. The computer implemented method of claim 1, the product review of the user is performed with use of a webpage form in which the user enters text based review data, wherein the communicating the prompting data to the user is performed so that there is displayed to the user on the user interface the prompting data with the text based review data, wherein the user interface is defined by a display of the client computer device, wherein the user interface includes a first webpage defining a vendor product review portal served by a computing node based system, and a second webpage defining a service product review portal served by computing node based manager system external to the computing node based system.

5. The computer implemented method of claim 1, wherein the product review of the user is performed with use of the user interface, wherein the user interface is defined by a display of the client computer device in which the user enters text based review data respecting the certain product, wherein the user interface includes a vendor webpage defining a vendor product review portal served by a computing node based system external from a computing node based manager system performing the examining and the determining, the vendor webpage having a text based data entry field for entry of text based product review data, the vender product review portal having a star rating form for providing an overall star rating for the certain product and being absent any topic specific star rating form, wherein the communicating the prompting data to the user is performed so that there is displayed to user on the user interface the prompting data with the text based review data, wherein the prompting data includes first and second topic specific star rating forms that prompt the user to enter respective first and second star ratings for the certain topic and a particular topic in relation to the certain product, wherein the method includes, in response to completion of the product review by the user, converting the first and second star ratings into respective first and second text segments having descriptive meanings mapping to the respective first and second star ratings, and auto-populating the first and second text segments into the text based data entry field for posting of the product review on a website hosted by the computing node based system.

6. The computer implemented method of claim 1, wherein the product review of the user is performed with use of the user interface, wherein the user interface is defined by a display of the client computer device in which the user enters text based review data respecting the certain product, wherein the communicating the prompting data to the user is performed so that there is displayed to the user on the user interface the prompting data with the text based review data, wherein the determining the prompting data in dependence on the extracting data tags associated to respective product reviews of the crowdsourced product review data includes subjecting data of the product review data to natural language processing for (a) identifying the percentage of crowdsourced product reviews accumulated respecting the certain product that return topic tags specifying the certain topic, and (b) ascertaining a sentiment level of the certain topic, and wherein the method includes, in dependence on the identifying the percentage of crowdsourced product reviews accumulated respecting the certain product that return topic tags specifying the certain topic, and in dependence on the ascertaining, providing the prompting data so that the prompting data prompts the user to enter text based review data into the user interface relating to the certain topic.

7. The computer implemented method of claim 1, wherein the product review of the user is performed with use of the user interface, wherein the user interface is defined by a display of the client computer device in which the user enters text based review data respecting the certain product, wherein the communicating the prompting data to the user is performed so that there is displayed to the user on the user interface the prompting data with the text based review data, wherein the determining the prompting data in dependence on the extracting data tags associated to respective product reviews of the crowdsourced product review data includes subjecting data of the product review data to natural language processing for identifying percentage of crowdsourced product reviews accumulated respecting the certain product that return topic tags specifying the certain topic, wherein the method includes monitoring a stage of progress of the product review being authored by the user, and wherein the method includes, in dependence on the identifying the percentage of crowdsourced product reviews accumulated respecting the certain product that return topic tags specifying the certain topic, and further in dependence on the monitoring, providing the prompting data so that the prompting data prompts the user to enter text based review data into the user interface relating to the certain topic.

8. The computer implemented method of claim 1, wherein the method includes discovering using natural language processing topic extraction topics that have been referenced in text of the product review being authored by the user, and wherein the method includes, in dependence on an identifying the percentage of crowdsourced product reviews accumulated respecting the certain product that return topic tags specifying the certain topic, and in dependence on the discovering, providing the prompting data so that the prompting data references the certain topic, wherein the method includes iteratively performing the discovering and the prompting data during a time that the user authors the product review so that in response to the discovering indicating that entered text of the user referenced the certain topic, the prompting data is updated to be absent of a reference to the certain topic.

9. The computer implemented method of claim 1, wherein the extracted data tags include extracted sentiment tags, wherein the method includes iteratively performing the examining, and the determining, and iteratively adjusting a browsing data transmission process by which the client computer device transmits the user browsing data for facilitation of the examining of the user browsing data, wherein the iteratively adjusting of the browsing data transmission process is in dependence on a current outcome of the determining a current activity classification of the user.

10. The computer implemented method of claim 1, wherein the method includes in response to the current activity classification of the user being determined to be the classification of authoring the product review, performing the web crawling to obtain crowdsourced product review data of the certain product, wherein the examining user browsing data includes subjecting the user browsing data to natural language processing to extract a product identifier for the certain product, wherein the product review of the user is performed with use of the user interface, wherein the user interface is defined by a display of the client computer device in which the user enters text based review data respecting the certain product, wherein the communicating the prompting data to the user is performed so that there is displayed to the user on the user interface the prompting data with the text based review data, wherein the determining the prompting data in dependence on the extracting data tags associated to respective product reviews of the crowdsourced product review data includes subjecting data of the product review data to natural language processing for identifying the percentage of crowdsourced product reviews accumulated respecting the certain product that return topic tags specifying the certain topic, wherein the method includes discovering using natural language processing topic extraction topics that have been referenced in text of the product review being authored by the user, and wherein the method includes, in dependence on the identifying the percentage of crowdsourced product reviews accumulated respecting the certain product that return topic tags specifying the certain topic, and in dependence on the discovering, providing the prompting data so that the prompting data references the certain topic, wherein the method includes iteratively performing the discovering and the providing prompting data during a time that the user authors the product review so that in response to the discovering indicating that entered text of the user referenced the certain topic, performing updating of the prompting data so that the prompting data is absent of a reference to the certain topic, and wherein the method includes prior to the examining user browsing data, adjusting a threshold value based on configuration data entered into the user interface by the user, wherein the method includes finding that the percentage of crowdsourced product reviews specifying the certain topic exceeds the threshold value, and prior to the updating displaying the reference to the certain topic in the prompting data based on the finding.

11. The computer implemented method of claim 1, wherein the prompting data includes first and second topic specific star rating forms that prompt the user to enter respective first and second star ratings for the certain topic and a particular topic in relation to the certain product, wherein the method includes, in response to completion of the product review by the user, converting the first and second star ratings into respective first and second text segments having descriptive meanings mapping to the respective first and second star ratings, and auto-populating the first and second text segments into a text based data entry field for posting of the product review on a website hosted by a computing node based system.

12. The computer implemented method of claim 1, wherein the product review of the user is performed with use of the user interface, wherein the user interface is defined by a display of the client computer device in which the user enters text based review data respecting the certain product, wherein the user interface includes a webpage defining a product review portal, the webpage having a text based data entry field for entry of text based product review data, and a star rating form for providing a star rating, wherein the communicating the prompting data to the user is performed so that there is displayed to the user on the user interface the prompting data with the text based review data, wherein the determining the prompting data in dependence on the extracting data tags associated to respective product reviews of the crowdsourced product review data includes subjecting data of the product review data to natural language processing for identifying the percentage of crowdsourced product reviews accumulated respecting the certain product that return topic tags specifying the certain topic, and wherein the method includes, in dependence on the identifying the percentage of crowdsourced product reviews accumulated respecting the certain product that return topic tags specifying the certain topic, providing the prompting data so that the prompting data references the certain topic, wherein the prompting data includes a star rating form, wherein the method includes, in response to completion of the product review by the user, converting a star rating entered into the star rating form into a text segment having descriptive meanings mapping to the star rating, and auto-populating the text segment into the text based data entry field for posting of the product review.

13. The computer implemented method of claim 1, wherein the determining the prompting data in dependence on the extracting data tags associated to respective product reviews of the crowdsourced product review data using natural language processing includes the ascertaining, based on natural language processing extracted topic tags, whether the percentage of crowdsourced product reviews respecting the certain product accumulated within the corpus that specify the certain topic has satisfied the threshold percentage of crowdsourced product reviews.

14. The computer implemented method of claim 1, wherein the product review of the user is performed with use of the user interface, wherein the user interface is defined by a display of the client computer device in which the user enters text based review data respecting the certain product, wherein the communicating the prompting data to the user is performed so that there is displayed to the user on the user interface the prompting data with the text based review data.

15. The computer implemented method of claim 1, wherein the determining the prompting data in dependence on the extracting data tags associated to respective product reviews of the crowdsourced product review data using natural language processing includes ascertaining, based on natural language processing extracted topic tags, a topic of interest to a community of users, wherein the method includes iteratively, while the user is entering text based data into a text based data entry field, subjecting text entered by the user into the text based data entry field to processing by natural language processing to iteratively update a running track of topics for the user that have been extracted in dependence on the processing of the text entered by the user into the text based data entry field, and responsively to determining that the running track of topics for the user is absent of the topic of interest to the community of users, providing the prompting data so that the prompting data prompts the user to enter text based review data into the text based data entry field relating to the topic of interest to a community of users.

16. A system comprising:
a memory;
at least one processor in communication with the memory; and
program instructions executable by one or more processor via the memory to perform a method comprising:
examining user browsing data from a client computer device, the client computing device being associated to a user;
determining a current activity classification of the user in dependence on the examining user browsing data from the client computer device;
in response to the current activity classification satisfying a criterion, performing web crawling to obtain crowdsourced product review data of one or more product, the crowdsourced product review data comprising data from product reviews by multiple reviewers other than the user and including data from reviews from multiple product review sites;
subjecting the crowdsourced product review data to natural language processing for extracting data tags associated to respective product reviews of the crowdsourced product review data;
determining prompting data in dependence on the extracting data tags associated to respective product reviews of the crowdsourced product review data; and
communicating the prompting data to the user, the prompting data guiding the user in an authoring of a product review of a certain product, wherein the method includes ascertaining, based on natural language processing extracted topic tags, whether a percentage of crowdsourced product reviews respecting the certain product accumulated within a corpus that specify a certain topic has satisfied a threshold percentage of crowdsourced product reviews, and responsively to determining that the percentage of crowdsourced product reviews respecting the certain product accumulated within the corpus that specify the certain topic has satisfied the threshold percentage of crowdsourced product reviews, providing the prompting data so that the prompting data prompts the user to enter text based review data into a user interface relating to the certain topic.

17. The system of claim 16, wherein the determining the prompting data in dependence on the extracting data tags associated to respective product reviews of the crowdsourced product review data using natural language processing includes the ascertaining, based on natural language processing extracted topic tags, whether the percentage of crowdsourced product reviews respecting the certain product accumulated within the corpus that specify the certain topic has satisfied the threshold percentage of crowdsourced product reviews.

18. The system of claim 16, wherein the product review of the user is performed with use of the user interface, wherein the user interface is defined by a display of the client computer device in which the user enters text based review data respecting the certain product, wherein the communicating the prompting data to the user is performed so that there is displayed to the user on the user interface the prompting data with the text based review data.

19. The system of claim 16, wherein the prompting data includes first and second topic specific star rating forms that prompt the user to enter respective first and second star ratings for the certain topic and a particular topic in relation to the certain product, wherein the method includes, in response to completion of the product review by the user, converting the first and second star ratings into respective first and second text segments having descriptive meanings mapping to the respective first and second star ratings, and auto-populating the first and second text segments into a text based data entry field for posting of the product review on a website hosted by a computing node based system.

20. The system of claim 16, wherein the product review of the user is performed with use of the user interface, wherein the user interface is defined by a display of the client computer device in which the user enters text based review data respecting the certain product, wherein the user interface includes a vendor webpage defining a vendor product review portal served by a computing node based system external from a computing node based manager system performing the examining and the determining, the vendor webpage having a text based data entry field for entry of text based product review data, the vender product review portal having a star rating form for providing an overall star rating for the certain product and being absent any topic specific star rating form, wherein the communicating the prompting data to the user is performed so that there is displayed to user on the user interface the prompting data with the text based review data, wherein the prompting data includes first and second topic specific star rating forms that prompt the user to enter respective first and second star ratings for the certain topic and a particular topic in relation to the certain product, wherein the method includes, in response to completion of the product review by the user, converting the first and second star ratings into respective first and second text segments having descriptive meanings mapping to the respective first and second star ratings, and auto-populating the first and second text segments into the text based data entry field for posting of the product review on a website hosted by the computing node based system.

21. A computer program product comprising:
a computer readable storage medium readable by one or more processing circuit and storing instructions for execution by one or more processor for performing a method comprising:
examining user browsing data from a client computer device, the client computing device being associated to a user;
determining a current activity classification of the user in dependence on the examining user browsing data from the client computer device;
in response to the current activity classification satisfying a criterion, performing web crawling to obtain crowdsourced product review data of one or more product, the crowdsourced product review data comprising data from product reviews by multiple reviewers other than the user and including data from reviews from multiple product review sites;
subjecting the crowdsourced product review data to natural language processing for extracting data tags associated to respective product reviews of the crowdsourced product review data;

determining prompting data in dependence on the extracting data tags associated to respective product reviews of the crowdsourced product review data; and communicating the prompting data to the user, the prompting data guiding the user in an authoring of a product review of a certain product, wherein the method includes ascertaining, based on natural language processing extracted topic tags, whether a percentage of crowdsourced product reviews respecting the certain product accumulated within a corpus that specify a certain topic has satisfied a threshold percentage of crowdsourced product reviews, and responsively to determining that the percentage of crowdsourced product reviews respecting the certain product accumulated within the corpus that specify the certain topic has satisfied the threshold percentage of crowdsourced product reviews, providing the prompting data so that the prompting data prompts the user to enter text based review data into a user interface relating to the certain topic.

* * * * *